United States Patent
Li et al.

(10) Patent No.: US 9,698,638 B2
(45) Date of Patent: Jul. 4, 2017

(54) ELECTRIC MACHINE COOLING SYSTEM

(75) Inventors: Qubo Li, Spring, TX (US); Joel Hetrick, Ann Arbor, MI (US)

(73) Assignee: Philip Totaro, Santa Barbara, CA (US)

( * ) Notice: Subject to any disclaimer, the term of this patent is extended or adjusted under 35 U.S.C. 154(b) by 881 days.

(21) Appl. No.: 13/559,351

(22) Filed: Jul. 26, 2012

(65) Prior Publication Data

US 2013/0171923 A1     Jul. 4, 2013

Related U.S. Application Data

(60) Provisional application No. 61/587,587, filed on Dec. 29, 2011, provisional application No. 61/581,597, filed on Dec. 29, 2011.

(51) Int. Cl.
| | |
|---|---|
| F24F 13/06 | (2006.01) |
| H02K 1/32 | (2006.01) |
| H02K 1/20 | (2006.01) |
| H02K 9/18 | (2006.01) |

(52) U.S. Cl.
CPC ............... H02K 1/32 (2013.01); H02K 1/20 (2013.01); H02K 9/18 (2013.01)

(58) Field of Classification Search
CPC ............... H02K 9/16; H02K 9/18; H02K 1/32
See application file for complete search history.

(56) References Cited

U.S. PATENT DOCUMENTS

| | | | | |
|---|---|---|---|---|
| 890,577 A | * | 6/1908 | Richards | 310/65 |
| 2,185,728 A | * | 1/1940 | Fechheimer | 310/57 |
| 3,348,081 A | * | 10/1967 | Willyoung | H02K 9/18 310/55 |
| 3,413,499 A | * | 11/1968 | Barton | 310/58 |
| 3,505,546 A | * | 4/1970 | Willyoung et al. | 310/55 |
| 3,684,906 A | * | 8/1972 | Lenz | 310/61 |
| 3,787,744 A | * | 1/1974 | Saito | H02K 1/185 310/216.011 |
| 3,906,265 A | * | 9/1975 | Giles | H02K 9/00 310/55 |
| 4,246,503 A | * | 1/1981 | Fujioka | H02K 9/10 310/59 |
| 4,264,834 A | * | 4/1981 | Armor | H02K 9/10 310/55 |
| 4,365,178 A | * | 12/1982 | Lenz | 310/61 |
| 4,876,470 A | * | 10/1989 | Geller | H02K 9/18 310/55 |

(Continued)

*Primary Examiner* — Gregory Huson
*Assistant Examiner* — Martha Becton
(74) *Attorney, Agent, or Firm* — Eric L. Lane; Green Patent Law

(57) ABSTRACT

A cooling system for an electric machine is provided. The cooling system includes an airflow diverter feature configured to provide even distribution of airflow to the electric machine. The airflow diverter feature includes a circular disk mounted to the housing of the electric machine. The disk defines a plurality of vents forming an axial air passage. A plurality of radial air passages are in fluid communication with the axial air passage. The airflow diverter feature defines at least one inlet and at least one outlet. The inlet comprises at least one interior choke and the outlet comprises at least one exhaust choke. The interior choke and the exhaust choke are sized to control a rate of air flow through the radial air passages.

11 Claims, 19 Drawing Sheets
(3 of 19 Drawing Sheet(s) Filed in Color)

(56) References Cited

U.S. PATENT DOCUMENTS

| | | | | |
|---|---|---|---|---|
| 5,767,602 | A * | 6/1998 | Sargeant | H02K 5/20 |
| | | | | 310/216.124 |
| 5,866,959 | A * | 2/1999 | Le Flem | 310/51 |
| 6,268,668 | B1 * | 7/2001 | Jarczynski | H02K 3/24 |
| | | | | 310/52 |
| 2004/0084976 | A1 * | 5/2004 | Thiot | 310/58 |
| 2010/0176670 | A1 * | 7/2010 | Gottfried | 310/61 |
| 2013/0119795 | A1 * | 5/2013 | Haga et al. | 310/59 |

* cited by examiner

ELECTRIC MACHINE COOLING SYSTEM

CROSS REFERENCE TO RELATED APPLICATIONS

This application claims the benefit of U.S. Provisional Patent Application No. 61/581,587, filed Dec. 29, 2011, entitled "ELECTRIC MACHINE COOLING SYSTEM" and U.S. Provisional Patent Application No. 61/581,597, filed Dec. 29, 2011, entitled ELECTRIC MACHINE COOLING SYSTEM, the content of which is hereby incorporated by reference in its entirety.

BACKGROUND

This application is related to air cooled electric machinery with an airflow diverter feature configured to provide even distribution of airflow to the electric machine.

SUMMARY

Air cooled permanent magnet rotors and stator systems may be designed to evenly move air across the end windings into the interior of the rotor through axial channels. The system may use an airflow diverter to evenly distribute the airflow angularly about the electric machine. In addition, the diverter may use various baffles or openings to direct the airflow toward the rotor air passages so that at least a portion of the airflow is forced first forced around the end windings of the stator.

After the airflow cools the end windings, the air may be split into parallel paths, a portion enters the rotor, and a portion enters the exterior of the stator. Air that enters the rotor is ejected radially through spacer vents which function as a radial fan system to generate considerable cooling for the generator rotor and stator. At high rotational speeds, the rotor and spacer vents may develop considerable head pressure and can generate large mass flow rates through the interior of the rotor. At high flow rates, air may separate from the outer wall of the rotor axial flow channels. This leaves a large "vena contracta" or separated wake that spans a formidable length of the axial channel. If rotor spacer vents are located in these regions, the separated wake will prevent air from moving into the spacer vent and then moving radially outward—thus starving the cooling in these local spacer vents.

The system described herein may utilize a specially designed flow restriction located in the interior of the generator which serves to slow the air moving through the rest of the rotor. This reduced velocity, if properly engineered, can eliminate the separated flow entering the rotor axial channels and can ensure that the airflow through the rotor spacer vents is more evenly distributed (e.g. providing an even volumetric flow rate). This creates a generator with lower peak temperatures and more evenly distributed temperature distributions. More evenly distributed temperature distributions may be beneficial to lower the power used to control temperature as well as enhance reliability (evenness of temperature is better for longevity of winding insulation).

The carefully shaped flow restrictor may be achieved with very low cost geometry modification of the standard spacer vent construction. Thus the cooling improvements described herein may be achieved at very low cost.

Accordingly, in some implementations a cooling system for an electric machine is provided. The cooling system may include an airflow restriction feature configured to provide airflow to a radial air passage of the electric machine.

In some implementations, the system includes a rotor for an electric machine. The rotor may include an axial air passage configured to receive airflow through an inlet port. The axial air passage may be in fluid communication with a plurality of radial air passages. The axial air passage may have a first cross-sectional area, for example, where the axial air passage is connected to a first radial air passage. Further, the axial air passage may have an internal choke portion with a second cross-sectional area that is less than the first cross sectional area, such that a portion of the airflow is provided to the first radial air passage.

The second cross sectional air passage area may be less than 90% of the first cross sectional area, and preferably in some implementations about 75% of the first cross sectional area. The second cross sectional area air passage may also be greater than 60% of the first cross sectional area.

The rotor may be constructed from a plurality of disks, where each disk includes a plurality of vents that form the axial air passage. The internal choke portion may be formed by a disk with vent opening that is smaller than the vent opening other disks. In addition, the internal choke portion may have a generally trapezoidal shape. Further, the trapezoidal or other shapes forming the choke may be radially spaced about the disk to form a segmented annular shape.

In some implementations, the rotor may include an exhaust choke. As such, an axial air passage may be formed in the rotor and configured to receive an airflow through an inlet port. The axial air passage may be in fluid communication with a plurality of radial air passages. The axial air passage may have a first cross-sectional air passage area allowing a certain airflow. Further, the axial air passage may have a choke portion, such as an exhaust choke, with a second cross-sectional area that is less than the first cross sectional area. The exhaust choke may be located downstream from the plurality of radial air passages such that a substantial airflow is provided to the plurality radial air passages.

For the exhaust choke, the second cross sectional area of the axial air channel may be less than 40% of the first cross sectional area, and preferably in some implementations may be about 25% of the first cross sectional area. Further, the second cross sectional area of the axial air channel may be greater than 10% of the first cross sectional area.

In addition, the rotor may be formed from a plurality of disks, each disk having a plurality of vents that form the axial air passage. The exhaust choke may be formed by a disk with vent opening that is smaller than other disks of the plurality of disks. Further, the opening at the exhaust choke may have a generally semi-circular shape.

In addition, it should be understood that the inner choke and the exhaust choke may be used together. Further, any number of chokes may be used with varying cross section areas. For example, the vent forming the axial passage at each choke may have a subsequently reduced cross sectional area from the inlet port to the exhaust port of the axial air passage. Each choke section may be formed by reducing the cross sectional area primarily from the inner edge of the axial air passage. As such, the choke portion may extend into the axial air passage radially from the center of the rotor.

As such, in some implementations, the rotor may include an axial air passage formed in the rotor and configured to receive an airflow through an inlet port. The axial air passage may be in fluid communication with a plurality of radial air passages. The axial air passage may have a first cross-sectional area where the axial air passage is connected to a first radial air passage of the plurality of air passages and the axial air passage may have a first choke portion with a second cross-sectional area that is less than the first cross sectional area such that a portion of the airflow is provided to the first radial air passage. In addition, the axial air passage may also have a second choke portion (e.g. an exhaust choke) with a third cross-sectional area that is less than the first cross sectional area downstream from the plurality of radial air passages such that a substantial airflow is provided to the plurality radial air passages.

Further, it is understood that the first and second chokes may have any combination of the characteristics described above or elsewhere in this application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
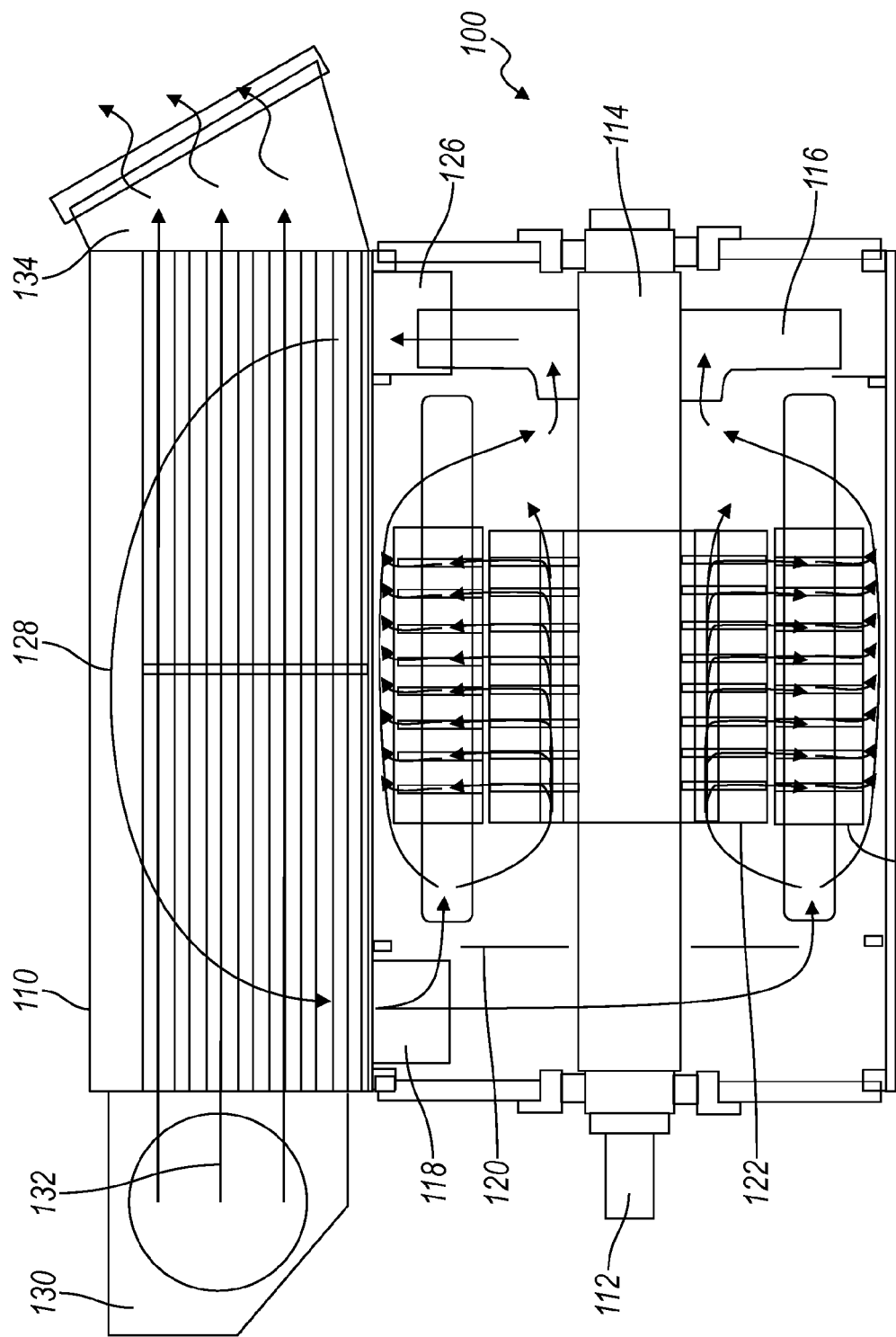
FIG. 1 is a cut away side view of an electric machine with a heat exchanger.

An electrical machine with a heat exchanger is provided in FIG. 1. The electrical machine 100 may be a generator, a motor, or other electrical machine. The heat exchanger 110 may be in fluid communication with the electrical machine 100 to cool the airflow through the electrical machine 100. The electrical machine 100 may include a drive end 112 that may be connected to a mechanical load in the case of a motor or may be driven by a turbine, such as an air turbine, hydraulic turbine, or other power input source in the case of a generator. The drive end 112 is connected to the rotor shaft 114 and rotates therewith. The rotation of the rotor shaft 114 also rotates the rotor assembly 122 and the fan blades 116. The rotation of the fan blades 116 pulls air from the inlet port 118 into the electrical machine 100.

The airflow from the air inlet 118 is directed by the diverter 120. The air diverter 120 forces air across the front end of the windings in the stator assembly 124. The air is then allowed to flow through air channels in the rotor assembly 122. Airflow may be apportioned through the air channels in the rotor assembly 122 by devices such as chokes located through the rotor assembly 122. The airflow may then be collected through the fan blade assembly 116 and distributed to the output port 126. The output port 126 provides the airflow from the electrical machine 100 to the heat exchanger 110.

The airflow from the electrical machine 100 circulates through the heat exchanger 110, as denoted by arrow 128. Heat is removed from the airflow 128 by an airflow 132 which is circulated from the inlet port 130 of the heat exchanger 110 to the outlet port 134 of the heat exchanger 110. Accordingly, the heat from the airflow 128 of the electric machine 100 transfers the heat generated by the electric machine 110 to the airflow 132 which is then transported away from the electric machine 100 as it leaves the heat exchanger 110.

It is contemplated within this disclosure that the rotor 122 and the stator 124 may be switched such that the rotor 122 is located outside of the stator 124. In the configurations shown, the rotation of the rotor 122 pushes the air radially through the stator. However, in an implementation where the rotor is outside the stator, rotation of the rotor would pull the air through the stator and, in the same manner, air would be directed to the fan assembly 116 and distributed to the heat exchanger 110.

Figure 2:
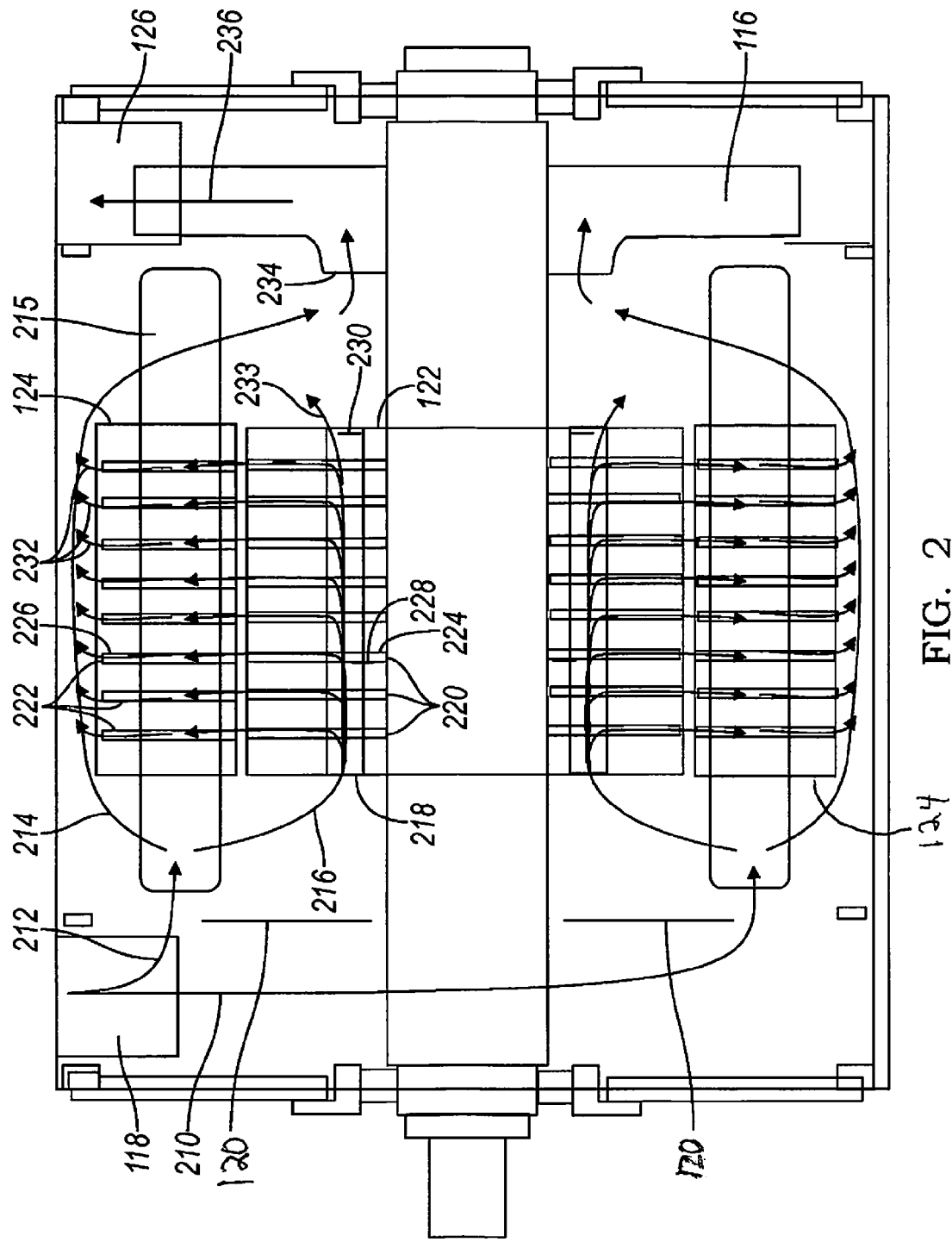
FIG. 2 is a cut away side view of an electric machine.

FIG. 2 is an illustration of an electrical generator which may be an implementation of the electrical machine 100 in FIG. 1. Airflow is received from the inlet port 118 and distributed circumferentially around the electric machine. The airflow is shown as being distributed to a top portion of the electric machine by arrow 212 and to a bottom portion of the electric machine by arrow 210. However, it should be noted that the stator and rotor would typically be cylindrical in nature and, therefore, the airflow would be distributed circumferentially around the entire electrical machine by the air diverter 120. The air diverter 120 would provide the airflow 212 to the windings 215 of the electric machine. The air diverter 120 may provide the air through openings within a plate while other solid portions of the plate may block airflow, thereby diverting the airflow to the openings which are distributed circumferentially around the plate and aligned radially with the end turns of the windings.

The airflow will be drawn through the electrical machine by the fan assembly 116 and also by rotation of the rotor assembly 122. Accordingly, the airflow 212 may be split into an airflow 214 that is drawn around the outside of the stator assembly 124 by the fan assembly 116 and also airflow 216 which is drawn through axial air channels 218 in the rotor assembly 122. The airflow 216 is drawn into the axial air channels 218 by rotation of the rotor assembly 122.

The rotation of the rotor assembly 122 pushes air through radial air channels 220 in the stator assembly 122. Each of the radial air channels 220 in the rotor assembly 122 are aligned with corresponding radial air channels 222 in the stator assembly 224. For example, air channels 220 in the rotor may be aligned in the axial dimension with the air channels 222 at the same axial location in the stator. Multiple air channels 220 and 222 have the same axial location but are radially spaced around the rotor and stator.

To aid in the distribution of air through the radial air channels along the axial length of the rotor assembly 122, one or more devices, for example chokes, may be located within the axial air channel 218 at one or more axial locations along the length of the rotor assembly 122. For example, an internal choke 228 may be located within the first few radial channels. The internal choke 228 may block a portion of the airflow 216, thereby aiding distribution of the airflow through the first few radial channels. The internal choke 228 may block 25% of the cross-sectional area of the axial air channel 218 although various other percentages may be used depending on the location of the choke within the air channel and the axial location of the choke within the air channel. In addition, a plurality of chokes may be used and located at variously axial locations along the length of the rotor assembly 122. Further, each choke may block an increased amount of cross-sectional area of the channel 218 as the axial location increases from the intake of the axial channel 218 to the exit of the axial channel 218. For example, while the interior choke 228 may block 50% of the cross-sectional area of the channel 218, a choke that is closer to the exit of the axial channel 218 may block a larger percentage of the cross-sectional area, for example choke 230 at the exhaust of the axial channel 218 may block 75% of the cross-sectional area of the channel 218.

Accordingly, the airflow that is diverted through the radial channels, denoted by arrows 232, may join up with the airflow 214 diverted along the outside of the stator. Airflows 232 and 214 may then be drawn back across the exhaust side of the windings into the intake opening 234 of the fan assembly 116. Further, a portion of the airflow 216 through the axial air channel 218 may exit the exhaust end past the exhaust choke 230, as denoted by arrow 233. The airflow 233 may join up with the airflows 214 and 232 entering the intake port 234 of the fan assembly 116. Accordingly, the airflows are then communicated to the exhaust port 126, as denoted by arrow 236.

Figure 3:
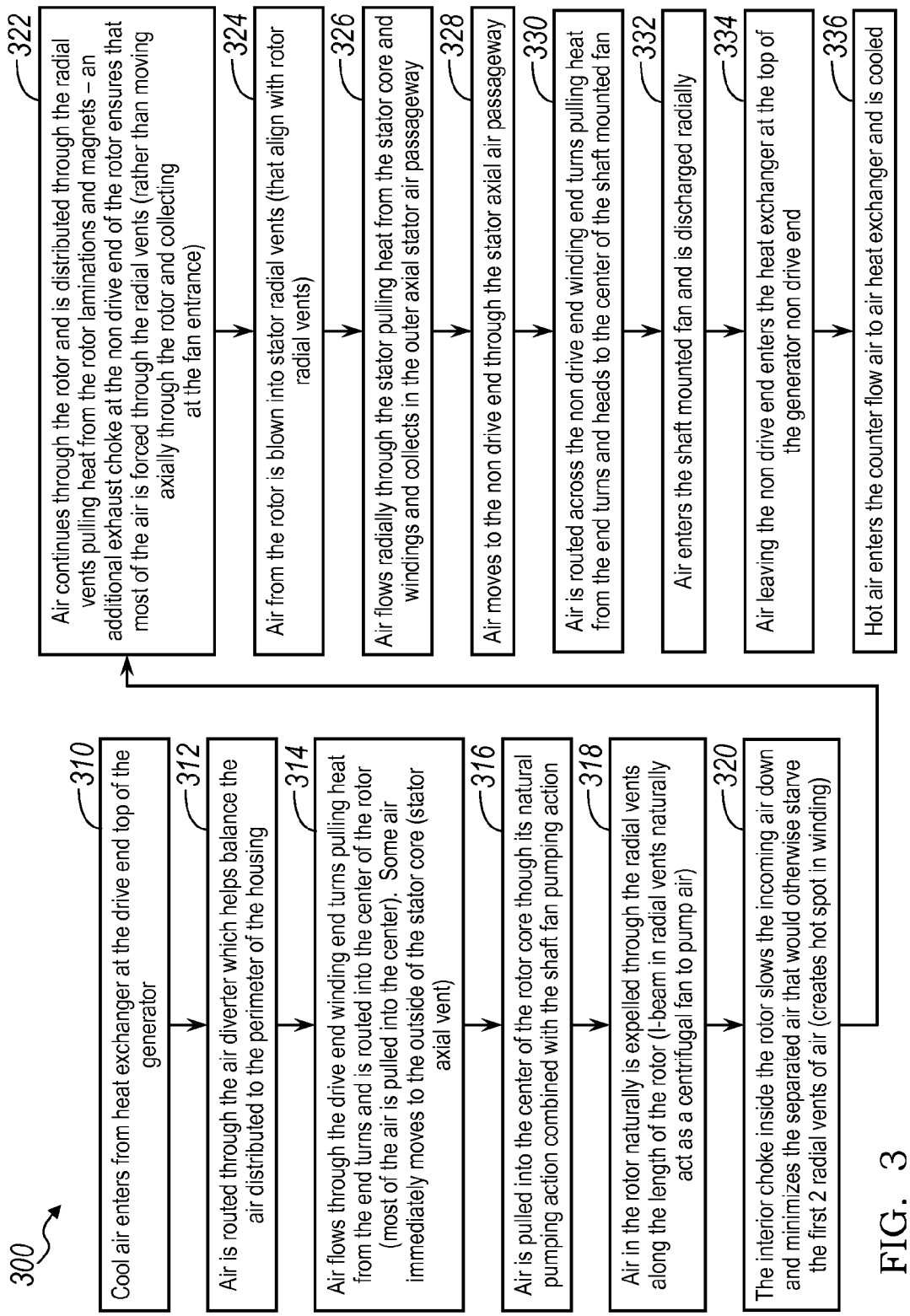
FIG. 3 is a flow chart illustrating a method for cooling an electric machine.

A method for cooling an electric machine, such as a generator is provided by the flow chart in FIG. 3. The method 300 starts in block 310. In block 310, cool air enters electric machine. For example, the cool air may enter from a heat exchanger at a drive end along the top of the electric machine. In block 312, the airflow is routed by an air diverter. The air diverter balances the air distribution around the perimeter of the housing. As noted in block 314, the air diverter routes the airflow across the winding end. For example, the airflow pulled through the air diverter flows across the end turns of the windings and into the center of the rotor. Most of the airflow may be pulled into the center of the rotor through air channels oriented axially through the rotor assembly. Some airflow may immediately move outside of the stator core traversing around the outside of the stator. Other portions of the airflow may then be pulled into the center of the rotor core, as noted by block 316. Rotation of the rotor core causes a natural pumping action that is combined with the shaft fan pumping action to draw the air to the non-drive end of the electric motor. In block 318, the rotation of the rotor causes the air in the rotor to be expelled through radial vents towards the outer portion of the rotor. The radial vents may be located along the axial length of the rotor thereby drawing air through the entire rotor. For example, I-beams in the radial vents may naturally act as a centrifugal fan to pump the air radially to the outer edge of the rotor.

An interior choke inside the rotor may slow down the incoming air, as denoted by block 320. The interior choke minimizes the separation of the air from the outer surface of the axial air channels, as discussed elsewhere in this application. Without the choke, the separation of air from the outer radial surface of the air channels which may starve the airflow through the first few radial vents and, thereby, create a hot spot in the magnets, windings, or laminates. In block 322, air continues through the rotor and is distributed through the radial vents pulling heat from the rotor laminations and magnets.

An additional exhaust choke may be located at the non-drive end of the rotor to ensure that most of the air space is forced through radial vents. The exhaust choke helps to ensure that most of the air is forced through the radial vents rather than traveling axially through the entire rotor and collecting at the fan entrance. Air from the rotors blow into stator radial vents as denoted by block 324. The stator radial vents are axially aligned with the rotor radial vents. The air from the rotor flows radially through the stator pulling heat from the stator core and windings, as denoted by block 326.

The air that flows radially through the stator collects in the outer axial stator air passageway. Air then moves to the non-drive end through the stator axial air passageway, as denoted in block 328. Air is then routed across the non-drive end windings, as denoted in block 330. The air passing over the end turns cools the windings by pulling heat from the end turns. The airflows from the end turns to the center of the shaft mounted fan. Air then enters the shaft mounted fan and is discharged radially, as denoted in block 332.

Air leaves the non-drive end and may, for example, be provided to a heat exchanger at a top of the electric machine at the non-drive end. If the heat is provided to a heat exchanger, the hot air enters the counter-flow air to exchange the heat thereby cooling the airflow, as denoted by block 336. Cooled air may then be provided from the heat exchanger back to the electric machine, as provided in block 310, where the cycle may continue.

Figure 4:
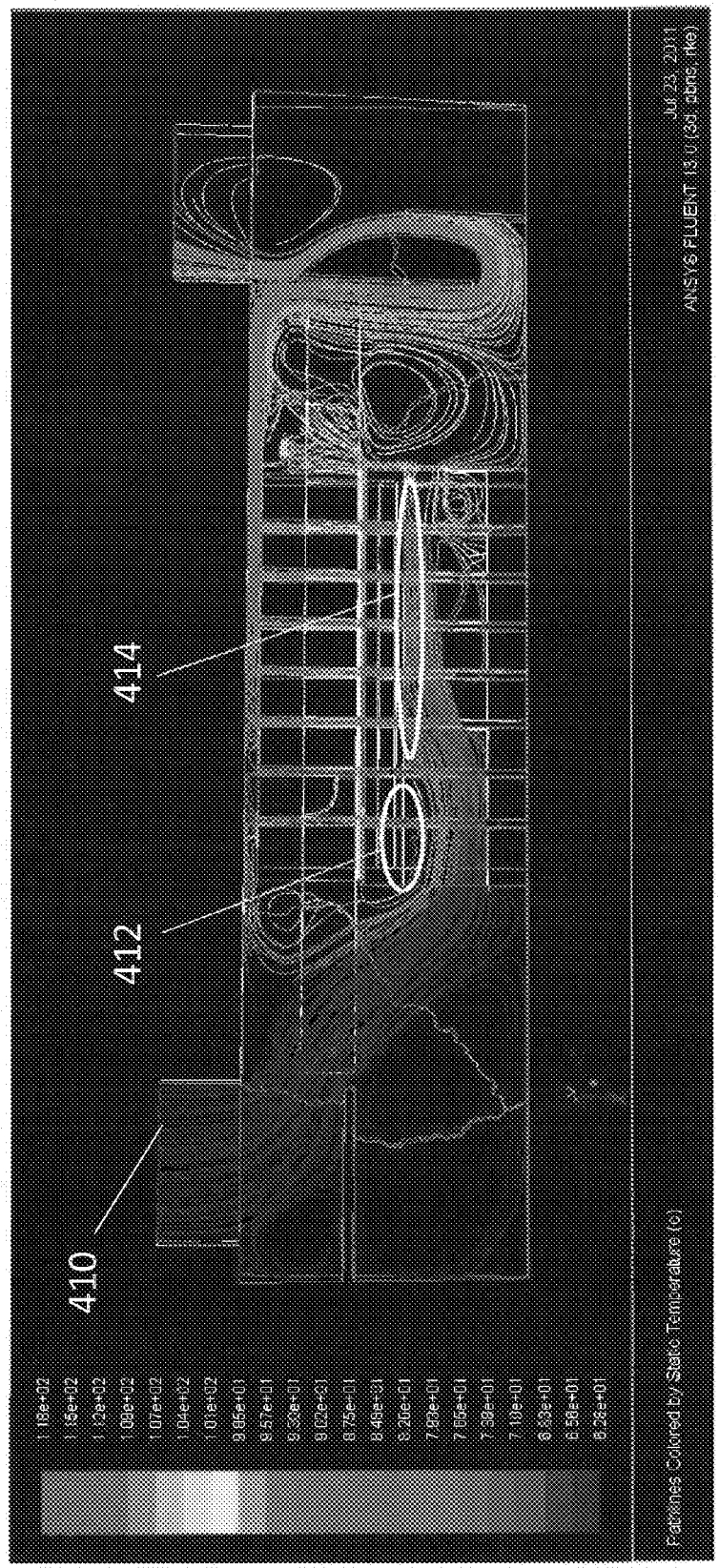
FIG. 4 is a color illustration of airflow through an electric machine.

FIG. 4 is a color illustration of the airflow through an electric machine. The airflow is denoted at the intake by reference numeral 410. Cooler air is shown by the blue color and hotter air at the top of the display temperature range is shown as a red color. Accordingly, it can be seen that the airflow 410 starts at the intake as blue and traverses to the non-drive end absorbing heat from the electric machine. Therefore, the increase in temperature is denoted by the green and yellow colors at the non-drive end of the airflow. Further, it is noted that a vacuum illustrated at circle 412 may form at the drive end of the axial rotor shaft. As such, the airflow would separate from the outer surface of the axial air channel that travels through the rotor.

The separation may starve the first few radial air channels. However, the airflow then is directed to the outer surface, as denoted by reference numeral 414, as the airflow progresses longitudinally along the axial air channel. The separation at reference numeral 412 may starve the first few radial channels of airflow thereby causing overheating in portions of the drive end of the electric machine. Devices, such as chokes, may be located within the axial air channel to redistribute the airflow in a balanced manner through all the radial channels.

Figure 5:
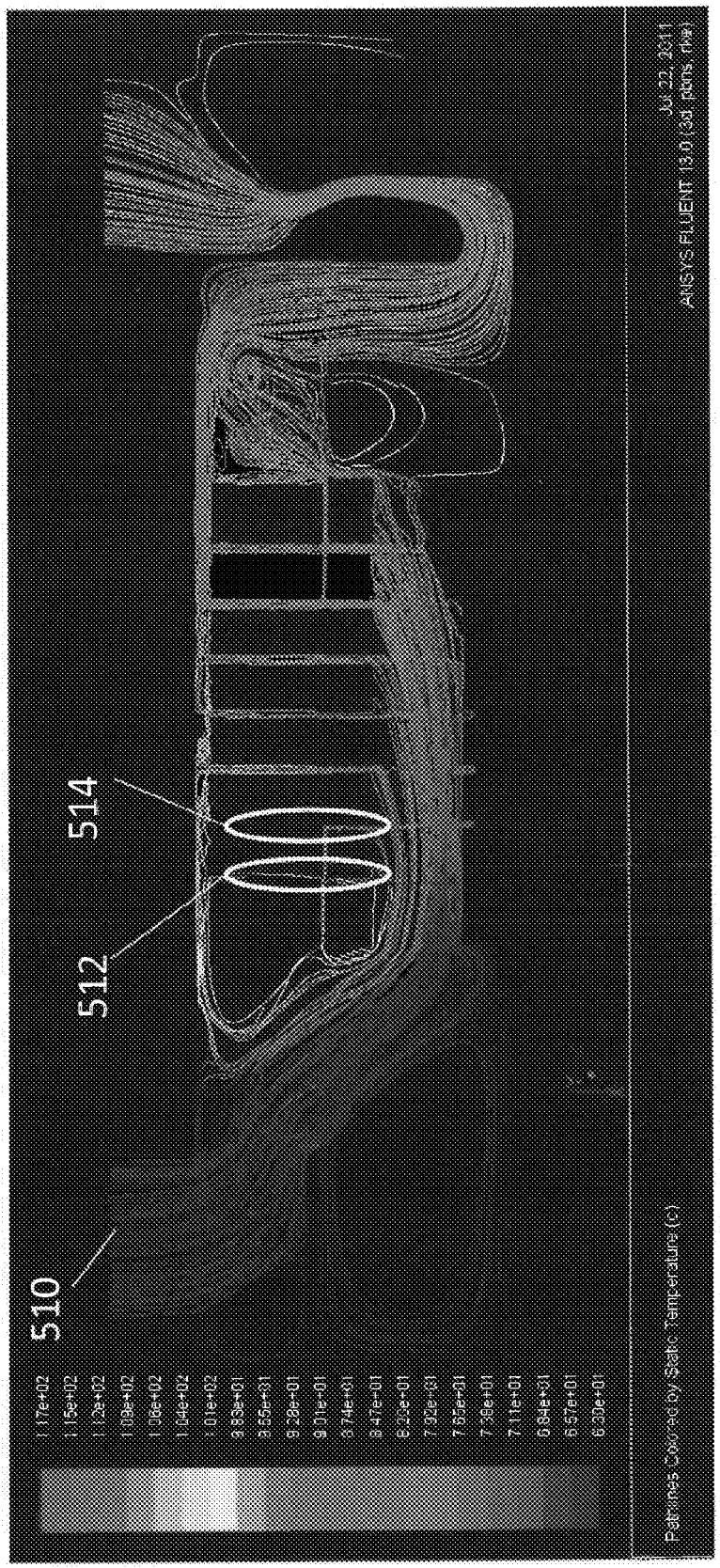
FIG. 5 is a color illustration of airflow through an electric machine where no interior choke is provided in the airflow.

FIG. 5 is a color depiction of airflow illustrating an electric machine where no inner choke is utilized and a 75% exhaust choke is utilized. The airflow is denoted at the entrance port by reference numeral 510. The airflow through the first channel is denoted by reference numeral 512 and the airflow through the second radial channel is denoted by reference numeral 514. The flow through the first channel 512 and the second channel 514 is much smaller in volume than the airflow through the latter radial channels. Therefore, the airflow is less able to cool the drive end of the rotor and stator. This can be visualized by the yellowish color of the airflow near the drive end which denotes a higher temperature in the air circulating around the stator and rotor.

Figure 6:
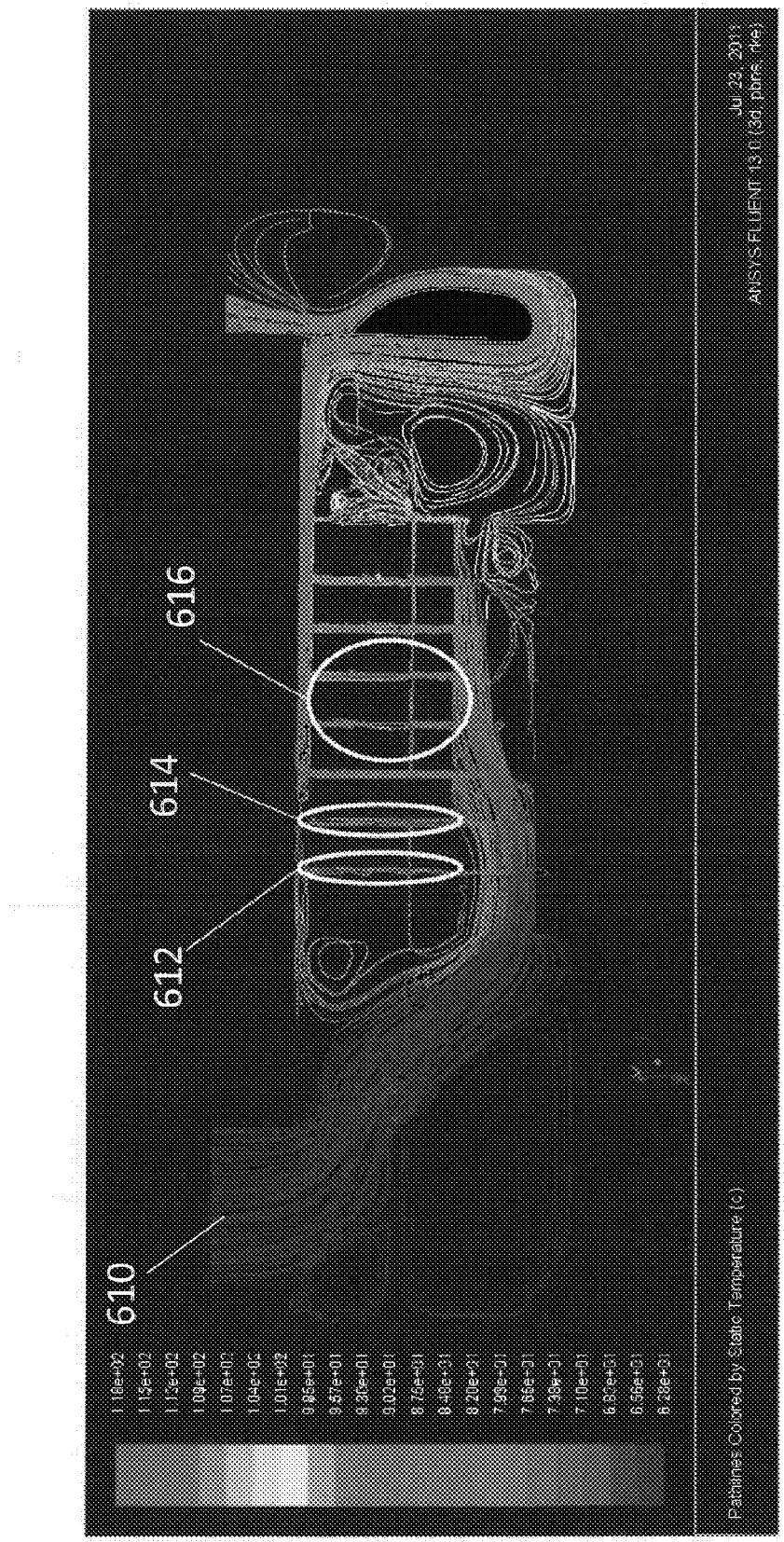
FIG. 6 is a color illustration of airflow through an electric machine with choking provided in the airflow.

FIG. 6 is a color depiction of airflow illustrating an electric machine where a 25% inner choke and a 75% exhaust choke is utilized. The airflow is denoted at the entrance port by reference numeral 610. Compared with FIG. 5, the airflow through the first channel 612 and the airflow through the second radial channel 614 are greatly increased. Accordingly, the rotor and stator towards the drive end are much cooler, as visualized by the darker green color. Further, good airflow is maintained in the radial passages in the middle of the rotor and stator due to the exhaust choke at the non-drive end of the axial channel.

Figure 7:
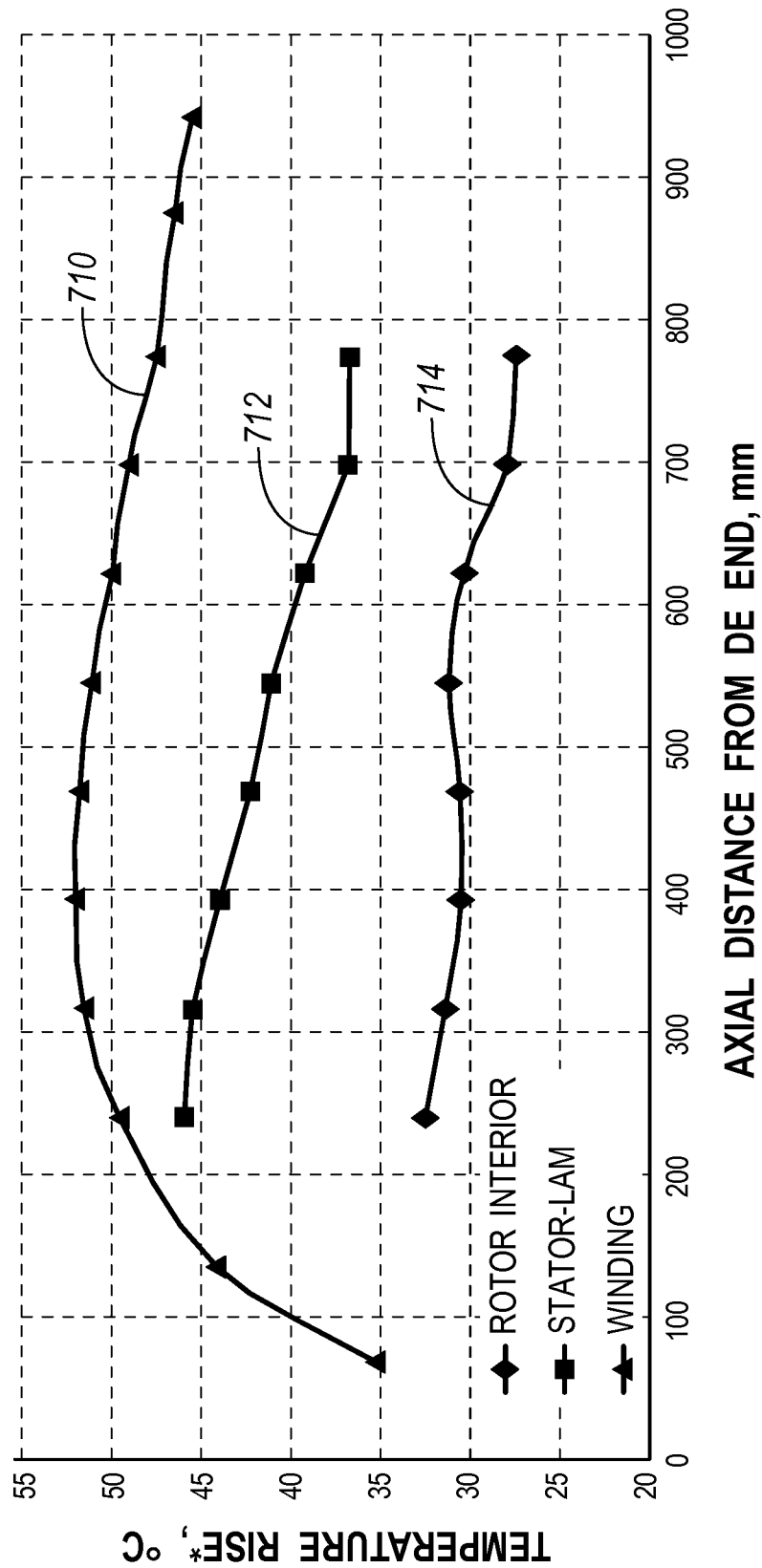
FIG. 7 is a graph illustrating the temperature of the magnet, stator lamination, and winding with respect to the distance from the driving end of an electric machine with no interior choke.

FIG. 7 is a graph illustrating the temperature of the rotor interior (e.g. magnets), stator laminations, and windings with respect to the axial distance from the drive end of the electric machine. The temperature of the windings is illustrated by line 710. The temperature of the stator laminations is denoted by reference numeral 712 and the temperature of the magnets is denoted by reference numeral 714. Generally, the temperature of the rotor interior is less than the temperature of the stator laminations. Further, the temperature of the stator laminations is generally less than the temperature of the windings. The graph provided in FIG. 7 relates the temperature of the magnet, stator laminations, and windings with no interior choke and a 75% exhaust choke. This also corresponds to the airflow in FIG. 5. These temperatures are with a 63° C. air from a heat exchanger and a 40° C. ambient temperature.

Figure 8:
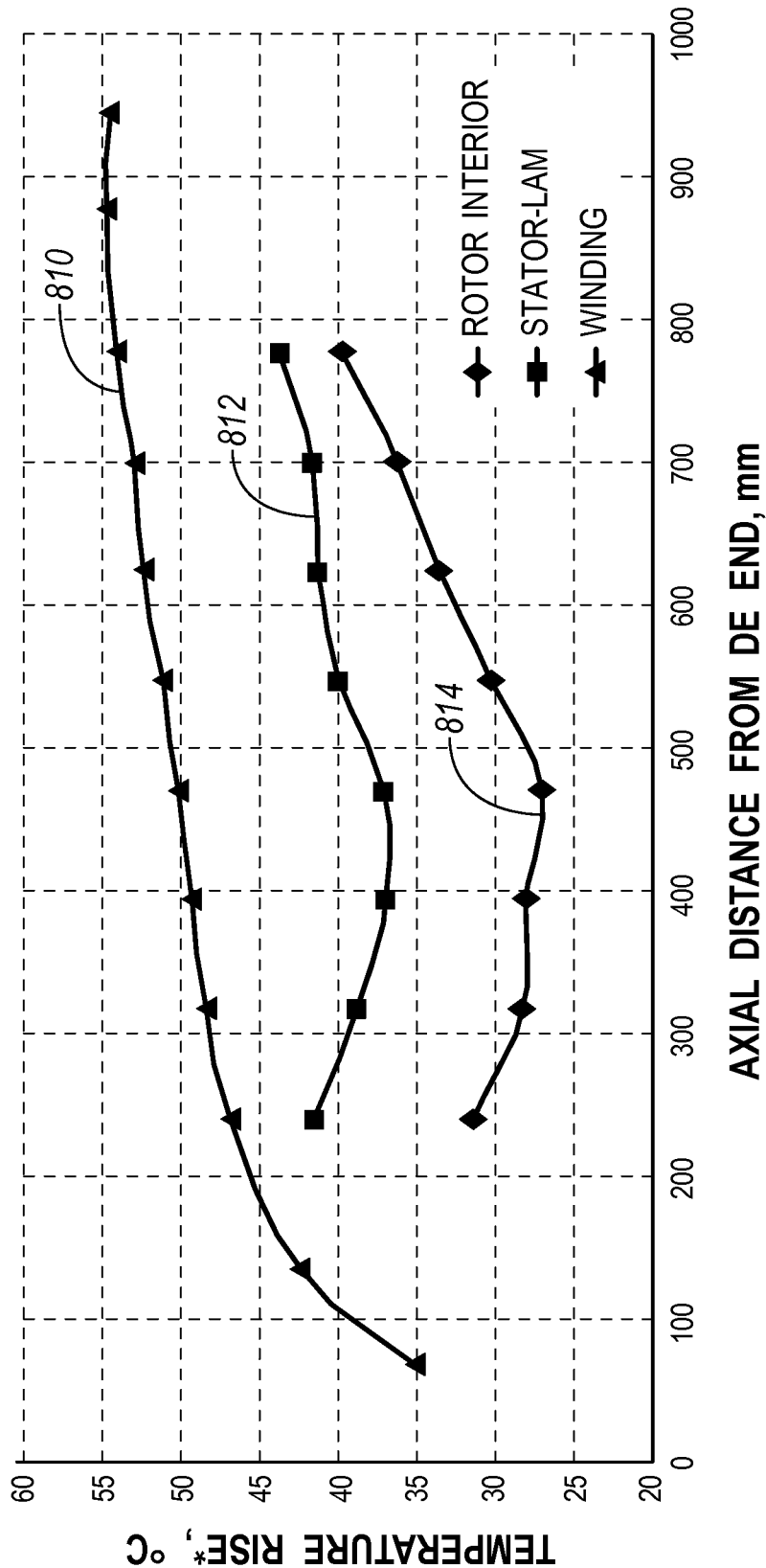
FIG. 8 is the temperature of the magnet, stator lamination, and winding that a given distance from the driving end of the electrical machine with a 25% interior choke and 75% exhaust choke.

FIG. 8 is a graph illustrating the temperature of the magnet, stator laminations, and windings with respect to the axial distance from the drive end of the electric machine. The temperature of the windings is illustrated by line 810. The temperature of the stator laminations is denoted by reference numeral 812 and the temperature of the magnets is denoted by reference numeral 814. The graph provided in FIG. 8 relates the temperature of the magnet, stator laminations, and windings with a 25% interior choke and a 75% exhaust choke. In this context, a 25% choke relates to, for example, a 25% reduction in the cross sectional area of the air channel. This also corresponds to the airflow in FIG. 4. These temperatures are with a 63° C. air from a heat exchanger and a 40° C. ambient temperature.

Figure 9:
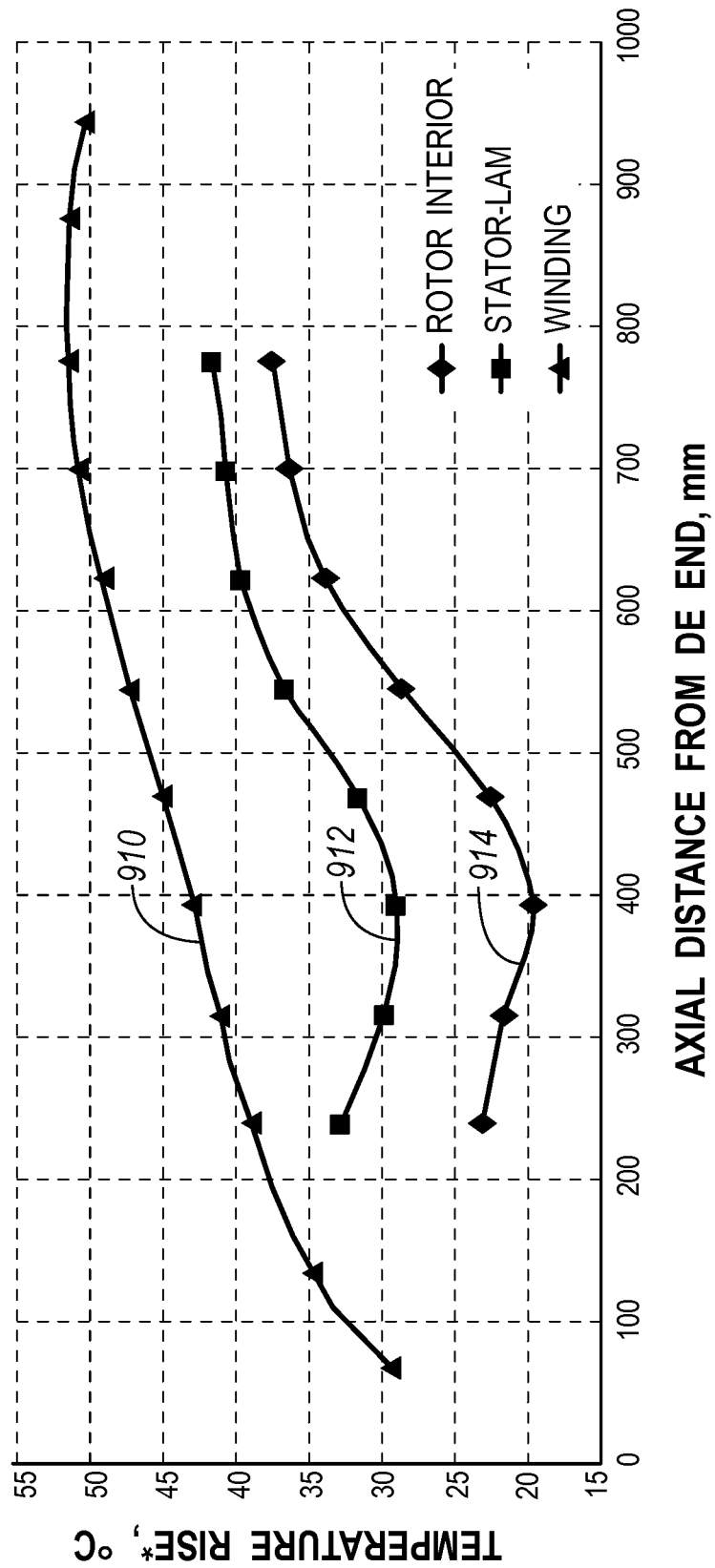
FIG. 9 is a graph illustrating a temperature of the magnet, stator lamination, and winding with respect to the distance of the driving end of the electrical machine with 50% interior choke and a 75% exhaust choke.

FIG. 9 is a graph illustrating the temperature of the magnet, stator laminations, and windings with respect to the axial distance from the drive end of the electric machine. The temperature of the windings is illustrated by line 910. The temperature of the stator laminations is denoted by reference numeral 912 and the temperature of the magnets is denoted by reference numeral 914. The graph provided in FIG. 9 relates the temperature of the magnet, stator laminations, and windings with a 50% interior choke and a 75% exhaust choke. This also corresponds to the airflow in FIG. 6. These temperatures are with a 63° C. air from a heat exchanger and a 40° C. ambient temperature.

In one example, design goal may be to keep the variation in the stator lamination to less than 10 degrees C. variation while minimizing the average magnet temperature and minimizing the peak winding temperature. In this case the pressure drop may also be observed to minimize fan power. The preferred configuration for one implementation was achieved with the 25% inlet choke and 75% exhaust choke which achieved a 7 degree C. stator temperature variation (max to min) and had an average magnet temperature of 31.9 deg C. The improved performance of this implementation is illustrated by the limited variation in line 812 and 814 in FIG. 8.

This improved performance is clarified when comparing, with the system having no interior choke and 75% exhaust choke in FIG. 7. The system of FIG. 7, has a 9 degree C. stator temperature variation and had an average rotor interior temperature of 30.1 deg C. The improved performance can also be compared with the system having 50% interior choke and 75% exhaust choke in FIG. 9. The system of FIG. 9 had a 13 degree C. stator temperature variation (max to min) and had an average magnet temperature of 28.3 deg C. (fan power was also increasing). Thus it is possible to "over choke" the interior choke. The exhaust choke was less sensitive although it did seem to function better at about 75% (or greater) or the shaft mounted fan aft of the rotor could pull too much air and the rear rotor vents could starve.

Figure 10:
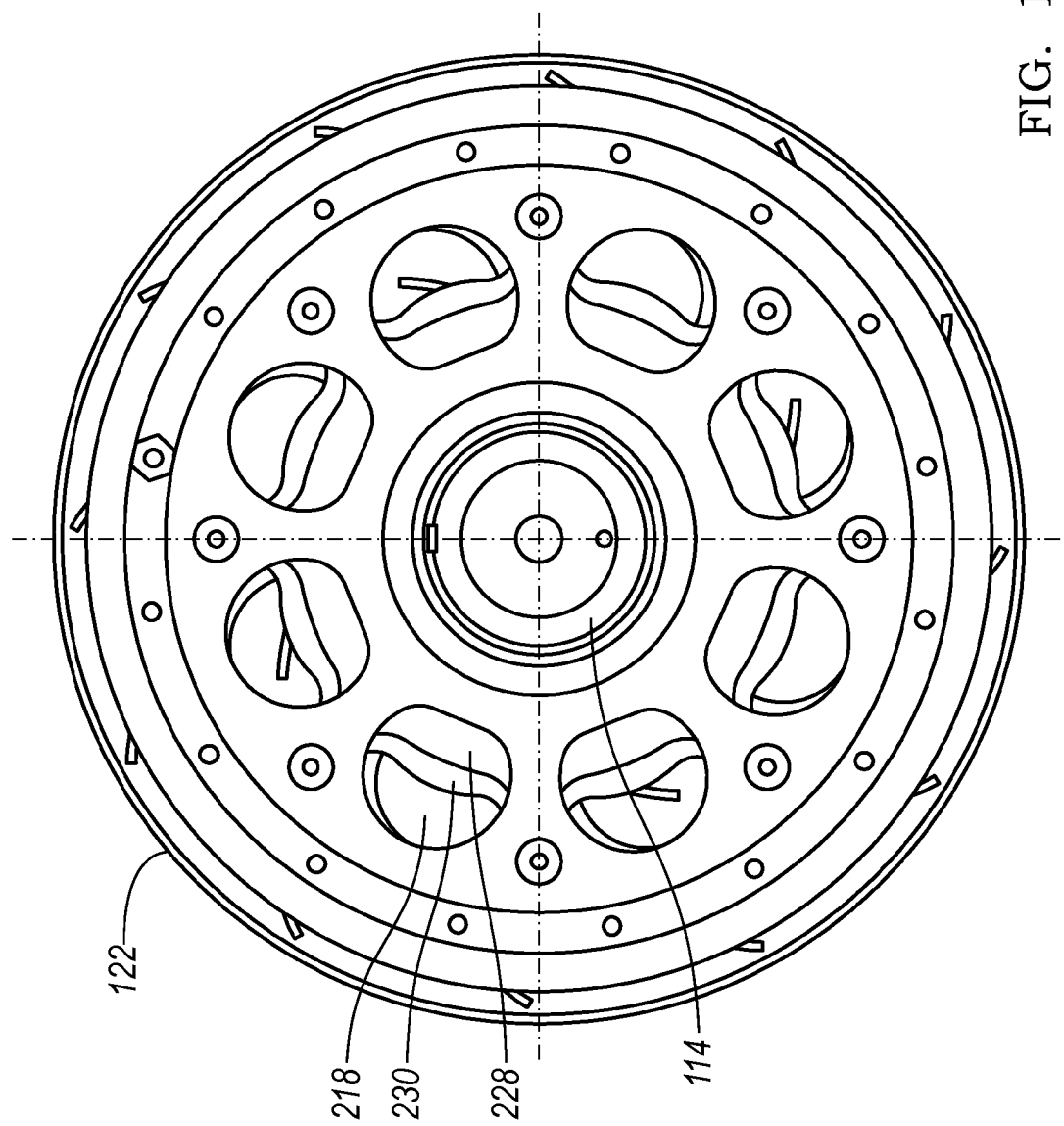
FIG. 10 is an end view of a rotor assembly illustrating the axial air channels with an interior and exhaust choke.

FIG. 10 is an end view of a rotor assembly 122. The rotor may be made up of a number of plates in the form of round disks. The disks may then be stacked and fastened to form the rotor assembly 122. The axial channels in the rotor assembly 122 are denoted by reference numeral 218. The interior choke 228 can be seen blocking approximately 25% of the axial channel 218. Further, the exhaust choke 230 may be seen blocking a larger portion of the axial channel 218. For example, the exhaust choke 230 may block approximately 75% of the cross-sectional area of the axial channel 218. Further, a hole may be provided in each of the plates allowing the rotor shaft 114 to extend therethrough. The rotor shaft 114 may be keyed to each of the plates thereby causing rotation of the rotor assembly 122 based on rotation of the rotor shaft 114.

Figure 11:
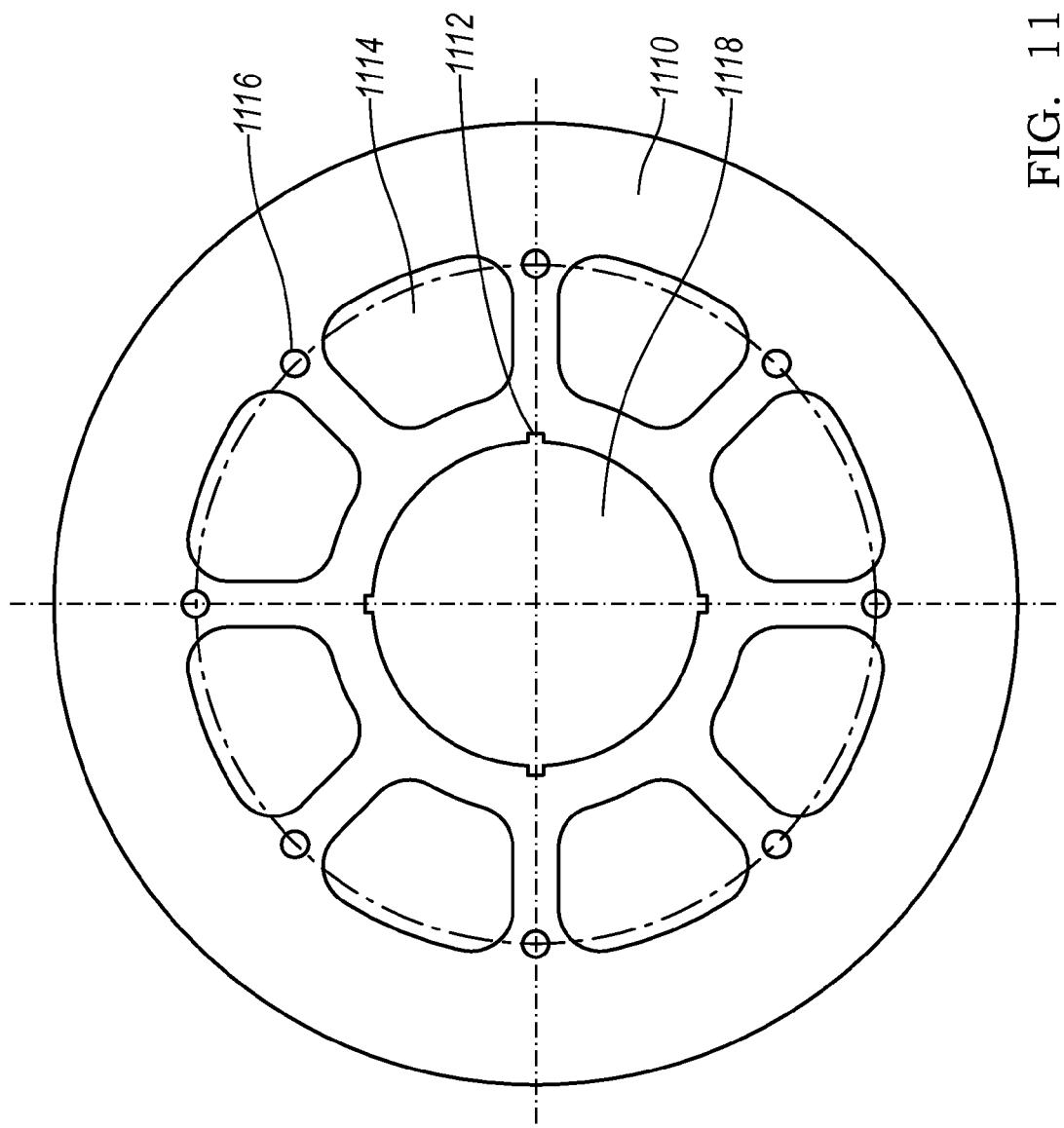
FIG. 11 is a front view of a rotor plate that forms part of the axial air channel.

FIG. 11 is one of a plurality of plates that may be used to build the rotor assembly 122. The plate 1110 may be formed of a laminated steel or other magnetically conductive materials. The rotor plate 1110 may be in the form of a disk such as a circular disk. The plate 1110 may include a plurality of holes 1114 arranged circumferentially around a center of the plate. The holes 1114 may form a portion of the axial air channel through the rotor assembly 122. The plate 1110 may also include a hole 1118 through the center of the plate allowing the rotor shaft to extend therethrough. In addition, the hole 1118 may include one or more keyways 1112 allowing the rotor shaft to engage the plate 1110 and rotate it along with the rotation of the rotor shaft. In addition, the plate may include a plurality of holes 1116 allowing fasteners to extend therethrough, thereby fastening the plurality of plates together to form the rotor assembly 122.

Figure 12:
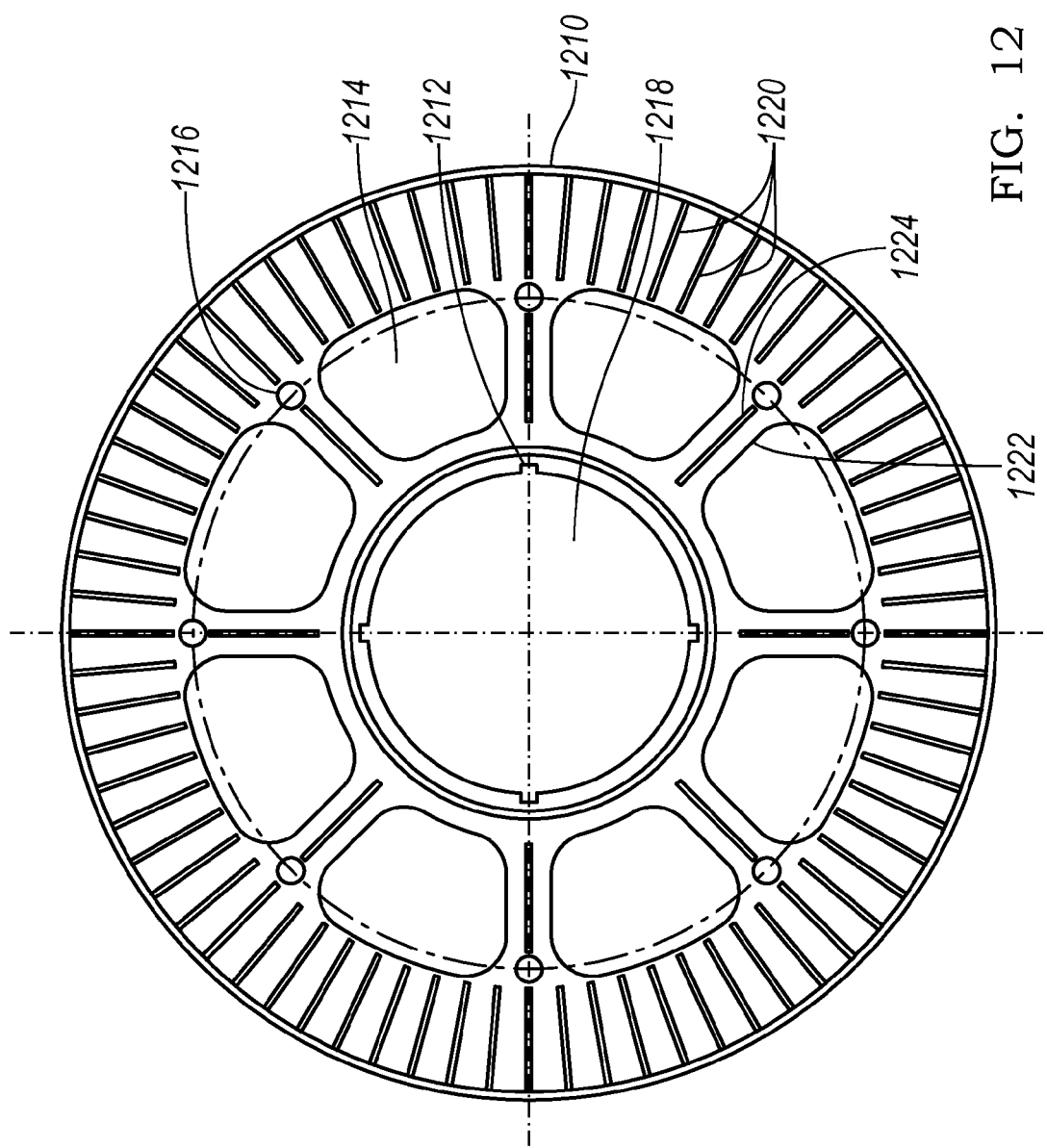
FIG. 12 is a plate that forms part of the radial air channels of the rotor.

FIG. 12 is rotor vent plate that may be used to build the rotor assembly 122. The rotor vent plate 1210 may be formed of a laminated steel or other magnetically conductive materials. The rotor plate 1210 may be in the form of a disk such as a circular disk. The plate 1210 may include a plurality of holes 1214 arranged circumferentially around a center of the plate. The plate 1210 may also include a hole 1218 through the center of the plate allowing the rotor shaft to extend therethrough. In addition, the hole 1218 may include one or more keyways 1212 allowing the rotor shaft to engage the plate 1210 and rotate the plate 1210 with the rotation of the rotor shaft.

The plate 1210 may include I-beams 1220 welded to a surface of the plate and extending radially. The I-beams 1220 may be located around the circumference of the plate 1210. The I-beams 1220 may be periodically spaced about the circumference, for example with equal angular spacing. Further, one or more I-beams may also be attached to portions 1222 of the plate extending between the holes 1214, as denoted by reference numeral 1224. The rotation of the plate 1210 causes the I-beams 1220 to force the air radially to the outer edge of the plate 1210. Accordingly, the rotor may act like a centrifugal pump. In addition, the plate 1210 may include a plurality of holes 1216 allowing fasteners to extend therethrough, thereby fastening multiple plates together to form the rotor assembly 122.

Figure 13:
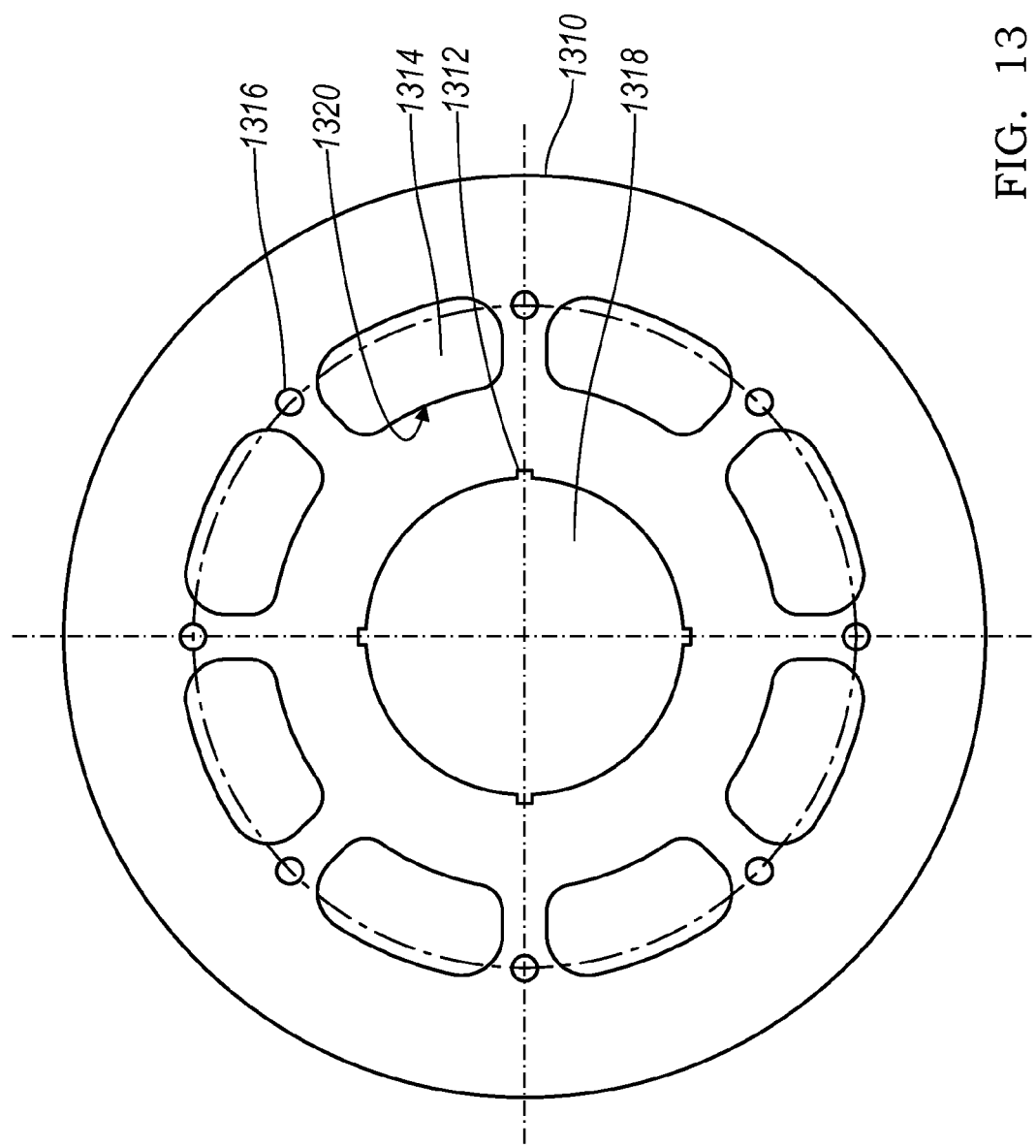
FIG. 13 is a plate that forms the interior choke of the rotor.

FIG. 13 is a plate for restricting air flow that may be used to build the rotor assembly 122. The plate 1310 may be formed of a laminated steel or other magnetically conductive materials. The rotor plate 1310 may be in the form of a disk such as a circular disk. The plate 1310 may include a plurality of holes 1314 arranged circumferentially around a center of the plate. The holes 1314 may form a portion of the axial air channel through the rotor assembly 122. Specifically, the holes 1314 may have a smaller cross sectional area than the holes 1114 through plate 1110. As such, the portion of the plate 1310 extending into the axial air channel defined by holes 1114 forms a choke to redistribute airflow through the axial air channel.

The plate 1310 may be located after the first few radial air channels or vents. Alternatively, multiple plates 1310 may be located along the rotor assembly, for example having holes 1314 with different shapes and/or cross sectional areas. As such, plate 1310 may form an interior choke for the rotor assembly 122. The holes 1314 may have less than 90% of the cross sectional area of the holes 1114. The holes 1314 may have a cross section area more than 60% of the cross section area of the holes 1114. In some applications, the cross section area of the holes 1314 may be about 75% of the cross sectional area of holes 1114.

The plate 1310 may also include a hole 1318 through the center of the plate allowing the rotor shaft to extend therethrough. In addition, the hole 1318 may include one or more keyways 1312 allowing the rotor shaft to engage the plate 1310 and rotate it along with the rotation of the rotor shaft. In addition, the plate may include a plurality of holes 1316 allowing fasteners to extend therethrough, thereby fastening the plurality of plates together to form the rotor assembly 122.

Figure 14:
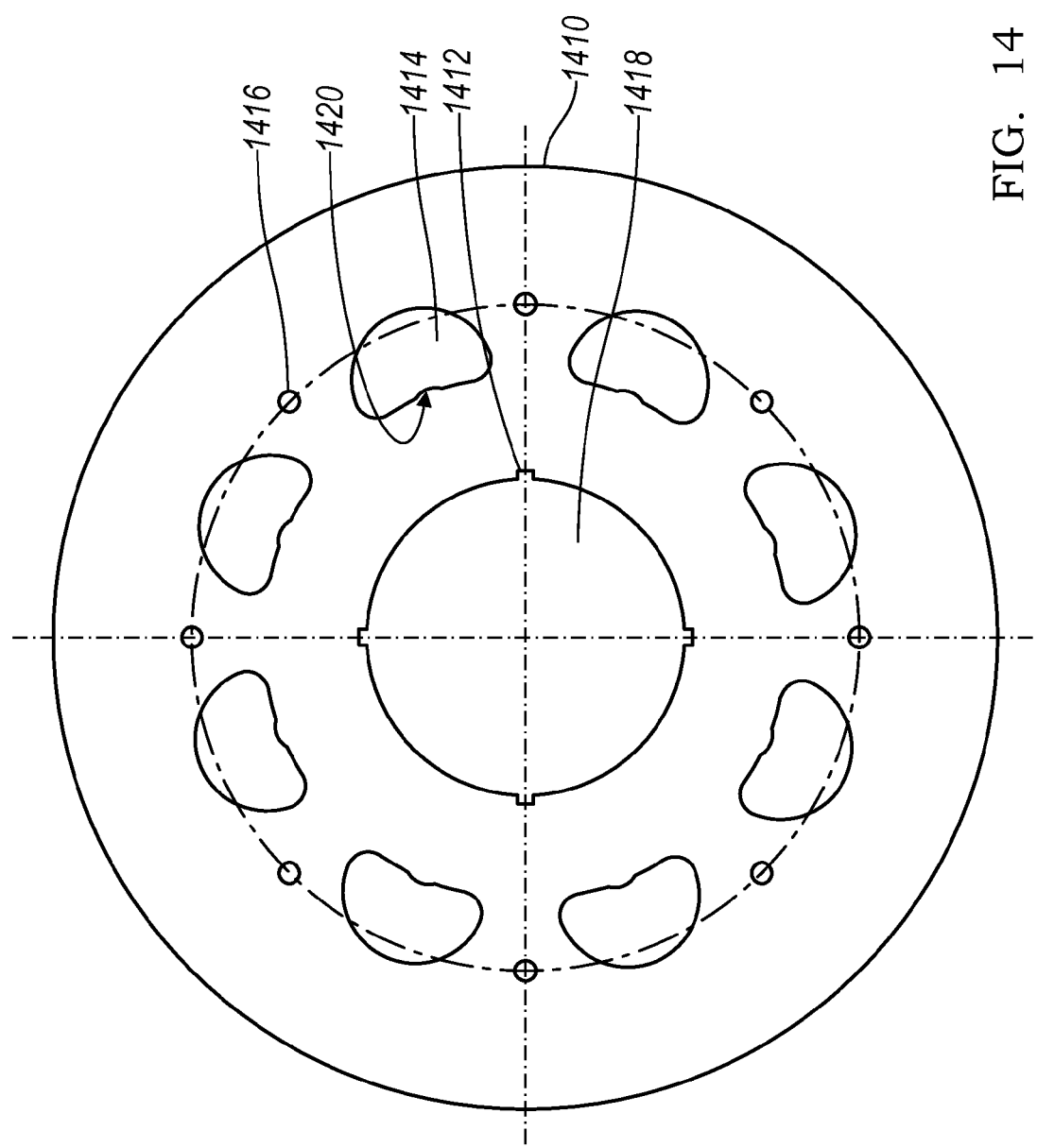
FIG. 14 is a plate that forms the exhaust choke of the rotor.

FIG. 14 is a plate for restricting air flow that may be used to build the rotor assembly 122. The plate 1410 may be formed of a laminated steel or other magnetically conductive materials. The rotor plate 1410 may be in the form of a disk such as a circular disk. The plate 1410 may include a plurality of holes 1414 arranged circumferentially around a center of the plate. The holes 1414 may form a portion of the axial air channel through the rotor assembly 122. Specifically, the holes 1414 may have a smaller cross sectional area than the holes 1114 through plate 1110. As such, the portion of the plate 1410 extending into the axial air channel defined by holes 1114 forms a choke to redistribute airflow through the axial air channel.

The plate 1410 may be located at the exhaust end of the axial air channel. As such, plate 1410 may form an exhaust choke for the rotor assembly 122. The holes 1414 may have less than 40% of the cross sectional area of the holes 1114. The holes 1414 may have a cross section area more than 10% of the cross section area of the holes 1114. In some applications, the cross section area of the holes 1414 may be about 25% of the cross sectional area of holes 1114.

The plate 1410 may also include a hole 1418 through the center of the plate allowing the rotor shaft to extend therethrough. In addition, the hole 1418 may include one or more keyways 1412 allowing the rotor shaft to engage the plate 1410 and rotate it along with the rotation of the rotor shaft. In addition, the plate may include a plurality of holes 1416 allowing fasteners to extend therethrough thereby fastening the plurality of plates together to form the rotor assembly 122.

Figure 15:
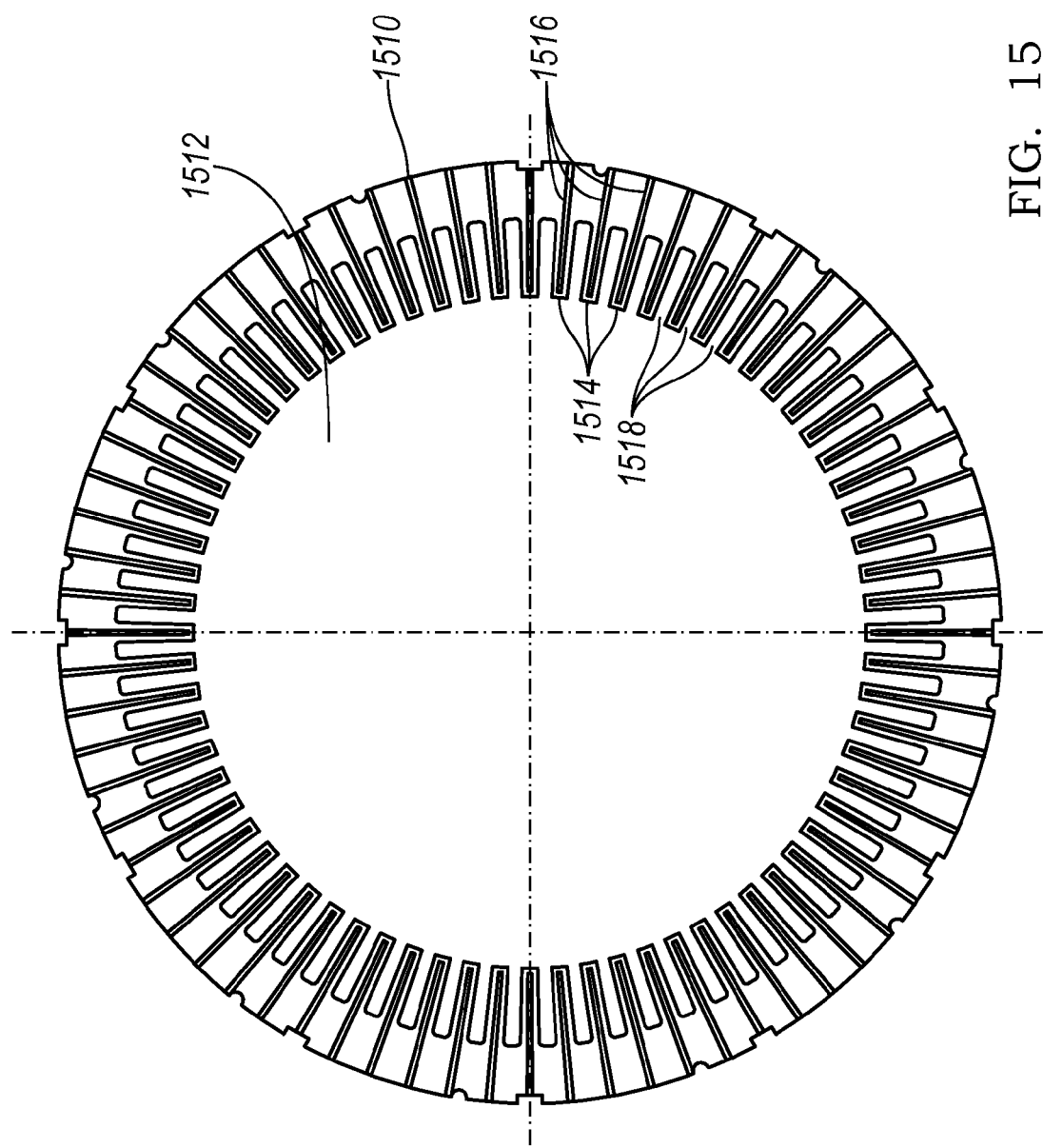
FIG. 15 is a plate that illustrates the stator radial vents.

FIG. 15 is a plate that forms the radial stator vents. The plate 1510 may be made of a laminated steel or other magnetically conducting material. The plate 1510 may have an opening 1512 allowing the rotor to extend therethrough. The plate 1510 may be in the shape of a disk and may include projections 1514 extending inwardly toward the center of the plate 1510 and as such, towards the rotor. The plate may include I-beams 1516 welded to a surface of the plate and extending radially. The I-beams may extend from the edge of the plate along the center of the projections inwardly towards the rotor. The projections 1514 may form channels 1518 that may be oriented axially with respect to the stator.

Figure 16:
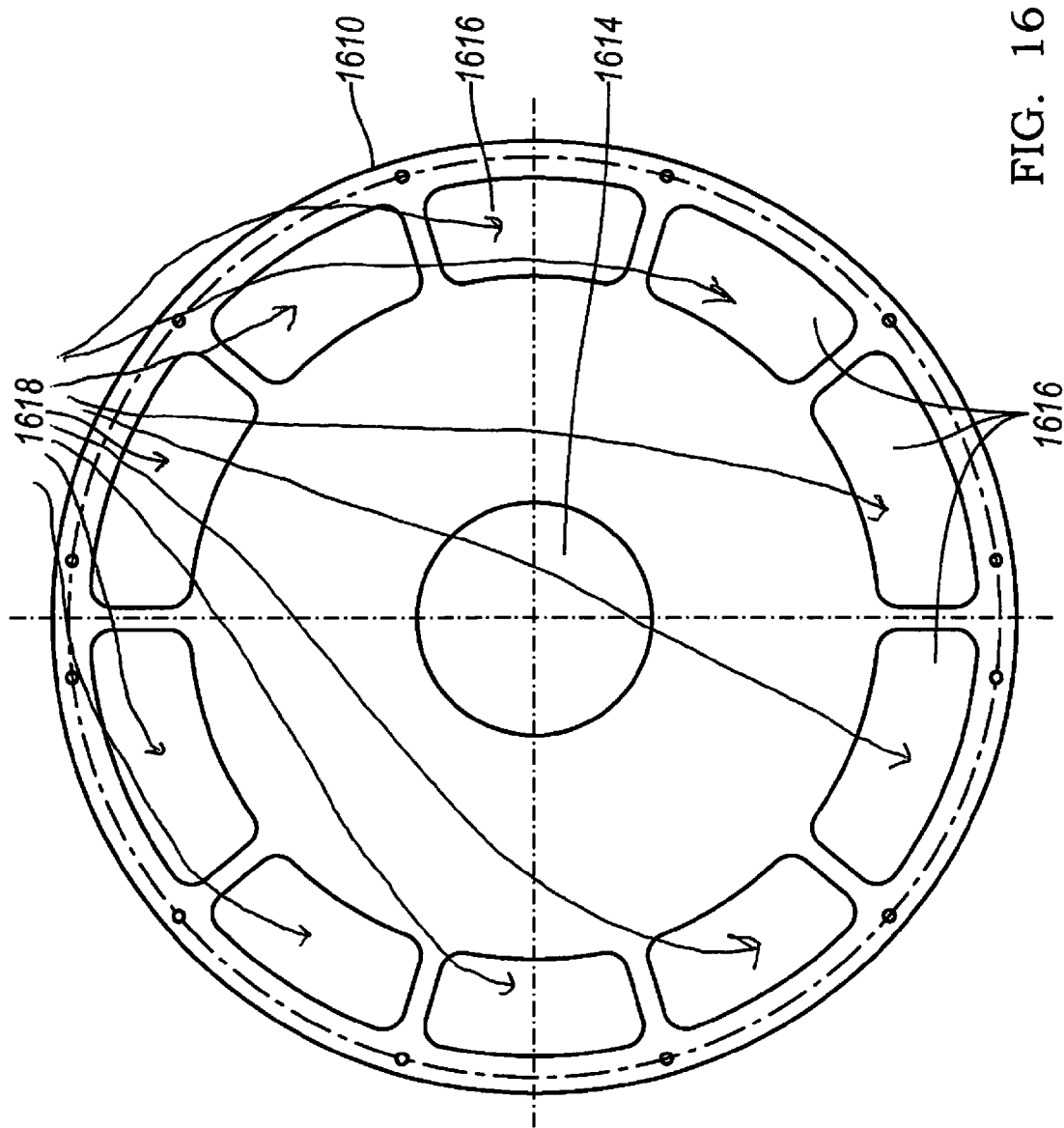
FIG. 16 is a plate that illustrates the air diverter.

FIG. 16 is a plate that forms the air diverter 120. The plate 1610 may be formed of a metal, plastic, or other material sufficiently sturdy for diverting air flow through the electric machine. The plate 1610 may be in the form of a disk such as a circular disk. The plate 1610 may be mounted to the housing of the electrical machine and, therefore, may be stationary. The plate 1610 may include a plurality of holes 1616 arranged circumferentially around a center of the plate. As such, the holes 1616 may from an annual passage through the plate 1610. The holes 1616 may force the airflow to the outer portion of the electric machine. In particular, the holes 1616 may be located radially outside the windings such that a portion of the airflow is forced to travel from the air inlet across the end turns of the windings before entering the rotor axial channels.

The annular opening 1618 formed by the holes 1616 may have an inner diameter that is larger than the diameter of a circular pattern formed by the axial air channels of the rotor. Further, the annular opening 1618 may have an inner diameter that is larger than the rotor diameter. In addition, the annular opening 1618 may have an outer diameter that larger than the diameter of the stator windings, such that the airflow is forced past the stator windings prior to entering the axial air channels.

The air diverter may be located axially adjacent to the windings such that the air flow is not allowed to travel directly to the axial air channels of the rotor without interacting with the end turns of the windings. The plate 1610 may also include a hole 1614 through the center of the plate allowing the rotor shaft to extend therethrough.

Figure 17:
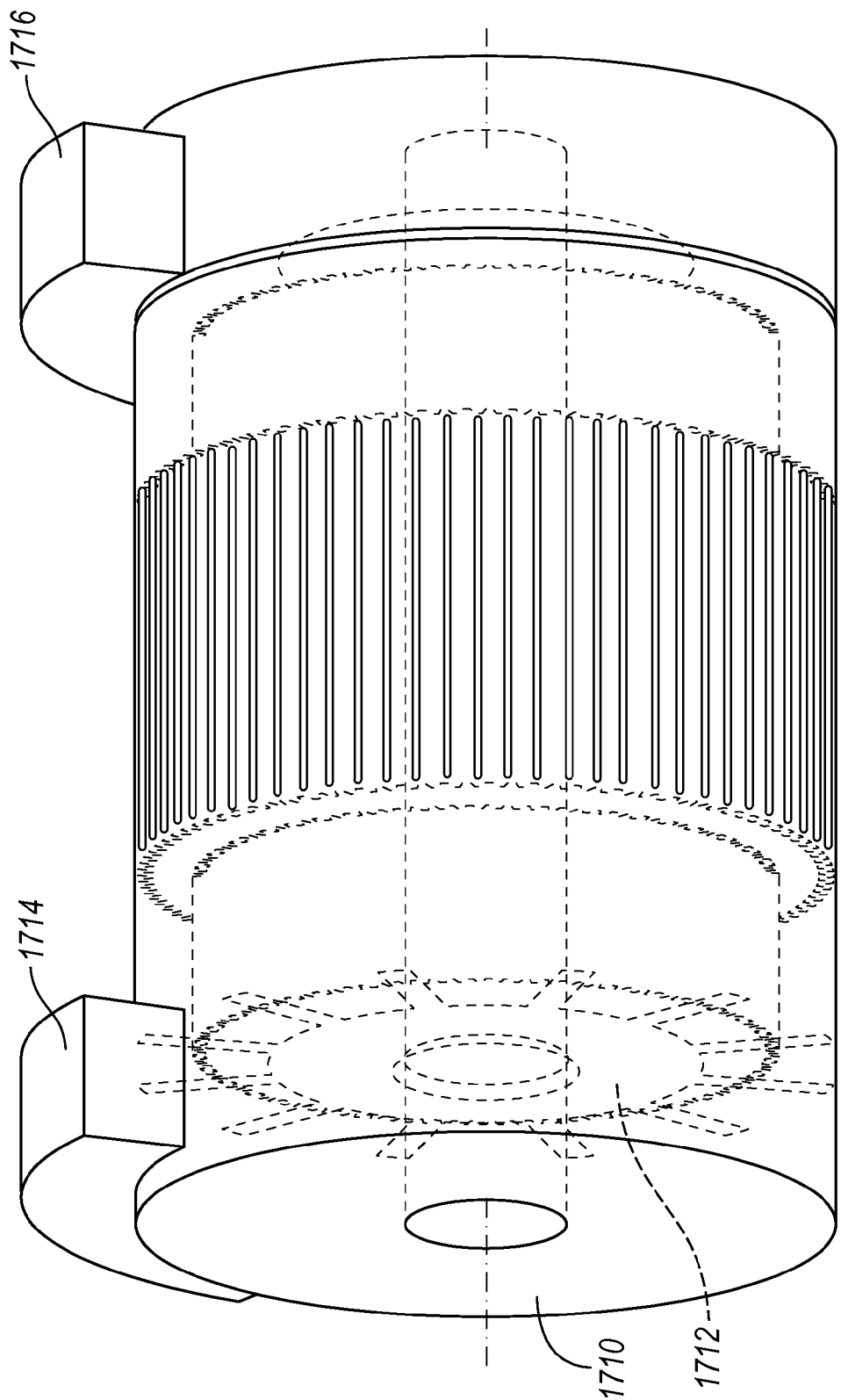
FIG. 17 is a wire frame drawing that illustrates one implementaion of the air diverter located within an electrical machine.

FIG. 17 is an illustration identifying one implementation of an air diverter. The housing of the electric machine 1710 may include an air inlet port 1714 and an air exhaust port 1716. Air may flow through the inlet port 1714 and be diverted by the air diverter 1712 peripherally around the circumference of the housing 1710. In FIG. 17, the air diverter 1712 may be formed by a disk shaped plate like the air diverter shown in FIG. 16. As such, projections from the air diverter 1712 may form openings that direct the air over the end turns of the winding in the stator. As such, the air would flow over the end turns of the windings and then towards the rotor and through axial air channels in the rotor to cool internally both the rotor and stator. The air will then proceed from the rotor and stator to the exit port 1716 such that the heat may be removed from the electric machine.

Figure 18:
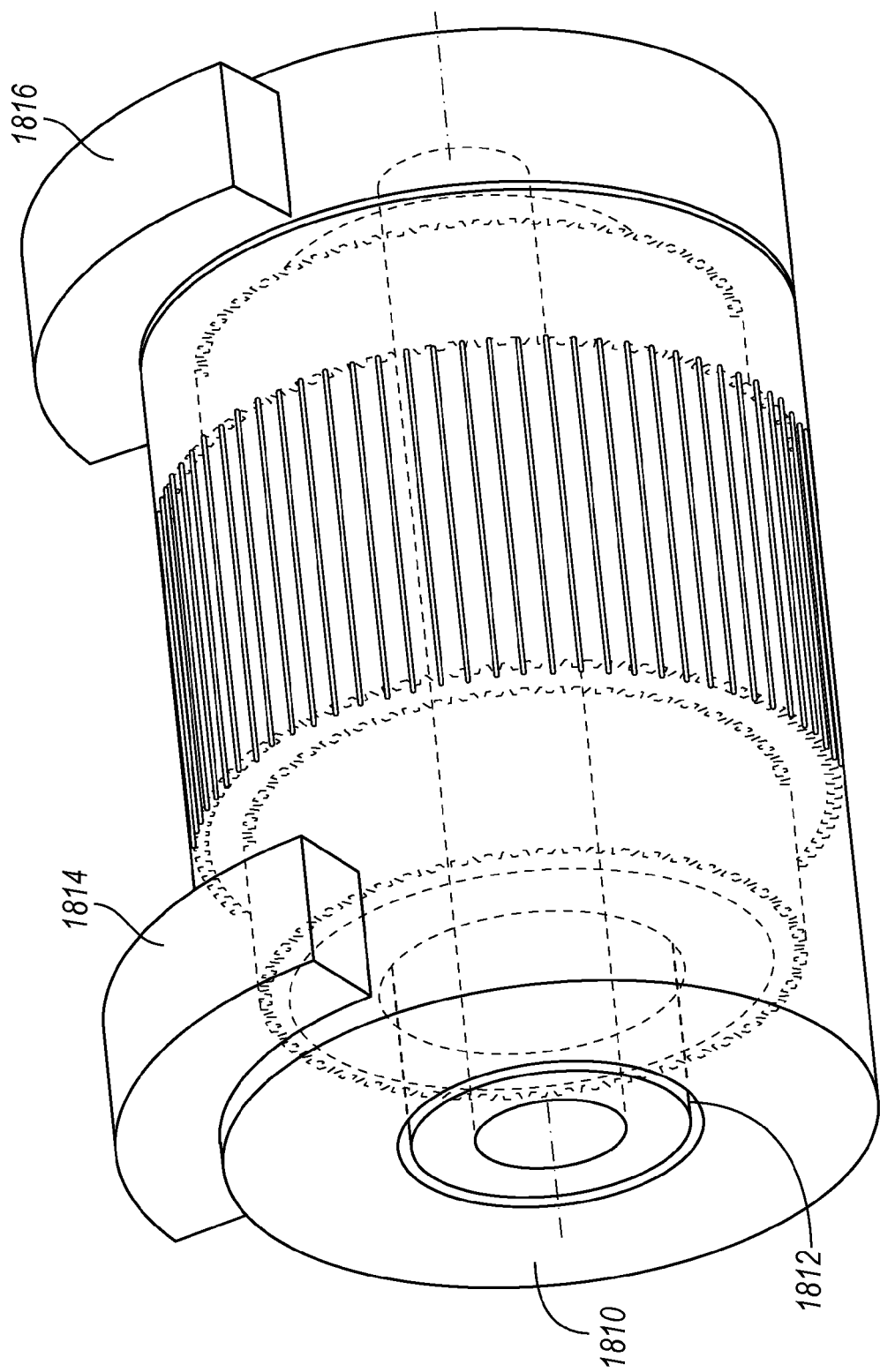
FIG. 18 is a wire frame drawing that illustrates another implementation of the air diverter located within an electrical machine.

FIG. 18 is an illustration identifying one implementation of an air diverter. The housing of the electric machine 1810 may include an air inlet port 1814 and an air exhaust port 1816. Air may flow through the inlet port 1814 and be diverted by the air diverter 1812 peripherally around the circumference of the housing 1810. In FIG. 18, the air diverter 1812 may be a baffle formed by a partially conical or cylindrical surface. The baffle may be extending radially inward from the housing of the electrical machine. As such, the partially conical or cylindrical surface of the air diverter 1812 may direct a portion of the airflow from the inlet port 1814 over the end turns of the winding in the stator. As such, the air would flow over the end turns and the windings and then towards the rotor and through axial air channels in the rotor to cool internally both the rotor and stator. The air will then proceed from the rotor and stator to the exit port 1816 such that the heat may be removed from the electric machine.

Figure 19:
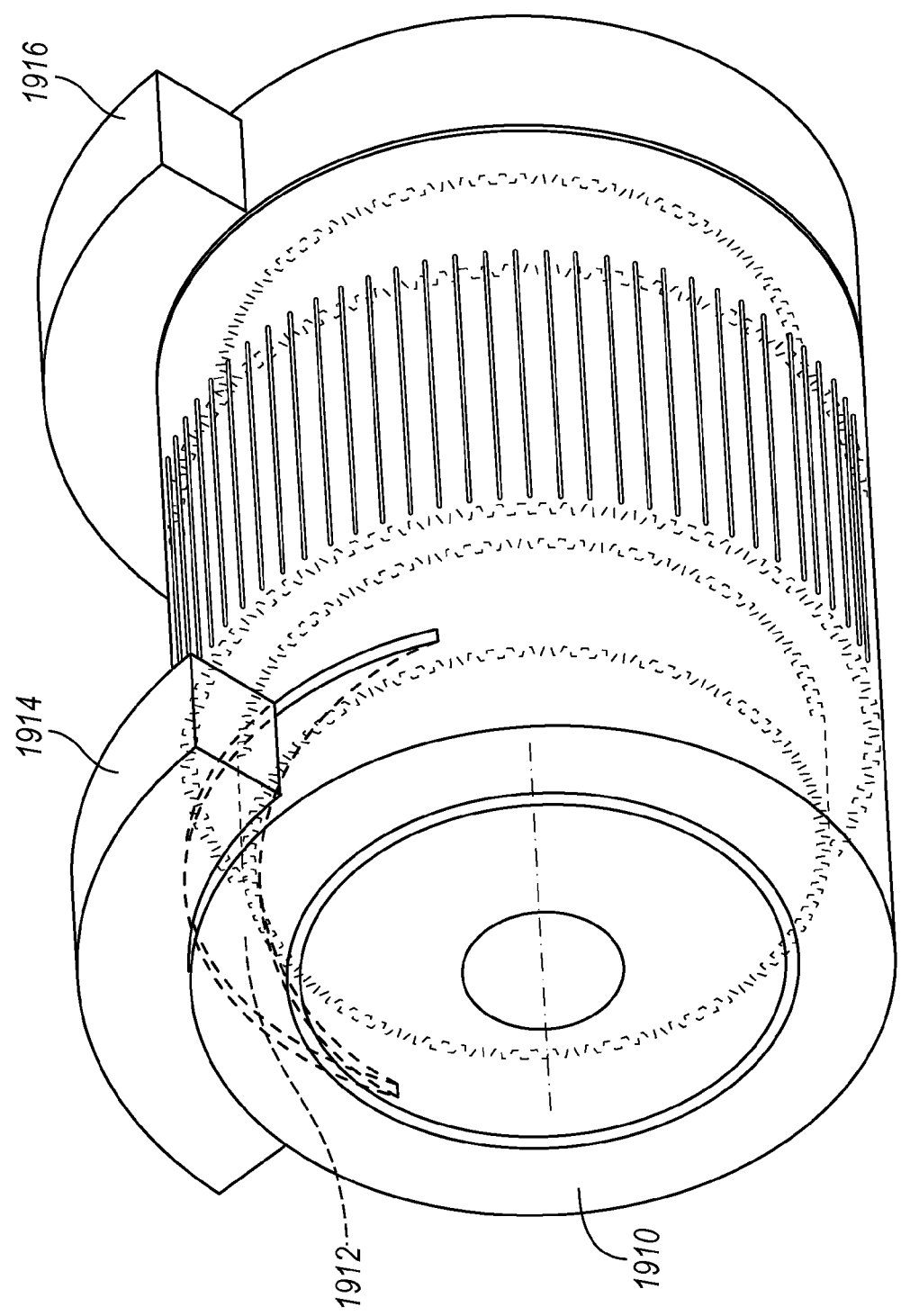
FIG. 19 is a wire frame drawing that illustrates yet another implementaion of the air diverter located within an electrical machine.

FIG. 19 is an illustration identifying one implementation of an air diverter. The housing of the electric machine 1910 may include an air inlet port 1914 and an air exhaust port 1916. Air may flow through the inlet port 1914 and be diverted by the air diverter 1912 peripherally around the circumference of the housing 1910. In FIG. 19, the air diverter 1912 is formed by a cylinder located around the rotor shaft and extending radially outward. The cylinder may be have a radius greater than the distance from the center of the rotor shaft to the axial air channels. As such, the cylinder may direct the air over the end turns of the winding in the stator. As such, the air would flow over the end turns and the windings and then towards the rotor and through axial air channels in the rotor to cool internally both the rotor and stator. The air will then proceed from the rotor and stator to the exit port 1816 such that the heat may be removed from the electric machine.

While a particular implementation of the above described concepts may be a permanent magnet machine, the concepts are equally applicable to electrical machines in general. Other types of electrical machines incorporating the above described elements may include, but are not limited to, wound-field synchronous, induction, switched reluctance, or variable reluctance machines. Further, any of the elements described above may be implemented alone or in combination regardless of the particularly described exemplary embodiments.

As a person skilled in the art will readily appreciate, the above description is meant as an illustration of the principles of this application. This description is not intended to limit the scope or application of this invention in that the invention is susceptible to modification, variation and change, without departing from spirit of this application, as defined in the following claims.

The invention claimed is:

1. A cooling system for an electric machine, the cooling system comprising:
    a stator defining at least one stator axial channel;
    a rotor defining at least one rotor axial channel;
    an inlet port in fluid communication with the stator and rotor axial channels;
    a rotor shaft and a plurality of fan blades, the rotation of which pulls air from the inlet port into the electric machine;
    a plurality of radial passages in fluid communication with the stator and rotor axial channels;
    an airflow diverter feature including a circular disk mounted to the housing of the electric machine, the disk defining a plurality of holes arranged circumferentially around a center of the disk such that airflow drawn in through the inlet port is separated such that a first airflow is diverted through the at least one rotor axial channel and a second airflow is diverted into the at least one stator axial channel;
    the plurality of radial passages including at least one interior choke and at least one exhaust choke, the interior choke and the exhaust choke being located to draw a portion of airflow from the at least one rotor axial channel and control a rate of airflow through the radial passages;
    wherein the at least one interior choke and the at least one exhaust choke are located such that the first airflow is divided into a radial airflow and an axial airflow;
    wherein the radial and axial airflows join up with the second airflow in the stator axial channel and the joined up airflow is communicated to an exhaust port.

2. The cooling system according to claim 1, wherein the airflow diverter is stationary.

3. The cooling system according to claim 1, wherein the interior choke blocks up to 25% of a cross-sectional area of the rotor axial channel.

4. The cooling system according to claim 1, wherein the interior choke blocks up to 50% of a cross-sectional area of the rotor axial channel.

5. The cooling system according to claim 1, wherein the exhaust choke blocks up to 75% of a cross-sectional area of the rotor axial channel.

6. The cooling system according to claim 1, wherein the airflow diverter includes a shaft opening allowing a rotor shaft to extend there through.

7. An electric machine including a cooling system, the electric machine and cooling system comprising:
    a rotor defining at least one rotor axial channel, a stator defining at least one stator axial channel, and one or more windings in the stator;
    an inlet port in fluid communication with the stator and rotor axial channels;
    an exhaust port in fluid communication with the stator and rotor axial channels;
    a rotor shaft and a plurality of fan blades, the rotation of which pulls air from the inlet port into the electric machine;
    at least one plate forming an air diverter configured to separate airflow to the electric machine, the at least one plate defining a plurality of openings circularly arranged circumferentially around a center of the at least one plate, wherein the circumferentially arranged plurality of openings has an inner diameter that is larger than the diameter of a circular pattern formed by the plurality of openings such that airflow drawn in through the inlet port is separated such that a first airflow is diverted through the at least one rotor axial channel and a second airflow is diverted into the at least one stator axial channel;
    at least one interior choke and at least one exhaust choke, each choke being formed by a disk;
    wherein the at least one interior choke and the at least one exhaust choke are located such that the first airflow is divided into a radial airflow and an axial airflow;

wherein the radial and axial airflows join up with the second airflow in the stator axial channel and the joined up airflow is communicated to an exhaust port.

8. The cooling system according to claim 7, wherein the electric machine comprises a rotor and the annular opening has an inner diameter that is larger than a diameter of the rotor.

9. The cooling system according to claim 7, wherein the electric machine comprises one or more stator windings and the annular opening has an outer diameter that larger than a diameter of the stator windings.

10. The cooling system according to claim 7, wherein the airflow diverter is located axially adjacent to windings of the electrical machine.

11. The cooling system according to claim 1, wherein the exhaust choke blocks up to 90% of a cross-sectional area of the axial air channel.

\* \* \* \* \*